US009459801B2

(12) United States Patent
Asayama

(10) Patent No.: US 9,459,801 B2
(45) Date of Patent: Oct. 4, 2016

(54) TIERED STORAGE SYSTEM PROVIDED WITH TRIAL AREA, STORAGE CONTROLLER, AREA ALLOCATION METHOD AND STORAGE MEDIUM

(71) Applicants: KABUSHIKI KAISHA TOSHIBA, Tokyo (JP); TOSHIBA SOLUTIONS CORPORATION, Kanagawa (JP)

(72) Inventor: Atsushi Asayama, Tokyo (JP)

(73) Assignees: Kabushiki Kaisha Toshiba, Tokyo (JP); Toshiba Solutions Corporation, Kanagawa (JP)

(*) Notice: Subject to any disclaimer, the term of this patent is extended or adjusted under 35 U.S.C. 154(b) by 108 days.

(21) Appl. No.: 14/501,497

(22) Filed: Sep. 30, 2014

(65) Prior Publication Data

US 2015/0268880 A1    Sep. 24, 2015

Related U.S. Application Data

(63) Continuation of application No. PCT/JP2014/057380, filed on Mar. 18, 2014.

(51) Int. Cl.
G06F 3/06    (2006.01)

(52) U.S. Cl.
CPC ........... G06F 3/0619 (2013.01); G06F 3/0665 (2013.01); G06F 3/0689 (2013.01)

(58) Field of Classification Search
CPC .............. G06F 3/0685; G06F 3/0631; G06F 3/0638–3/0644; G06F 3/0646–3/0647; G06F 3/0619; G06F 3/0665; G06F 3/0689
See application file for complete search history.

(56) References Cited

U.S. PATENT DOCUMENTS

| | | | | |
|---|---|---|---|---|
| 5,640,595 A * | 6/1997 | Baugher | ............. | H04L 12/5602 709/228 |
| 7,389,396 B1 * | 6/2008 | Goel | ................... | G06F 11/0727 711/112 |
| 7,487,327 B1 * | 2/2009 | Chang | ................. | G06F 12/1081 710/3 |
| 8,566,483 B1 * | 10/2013 | Chen | ..................... | G06F 3/0605 710/18 |

(Continued)

FOREIGN PATENT DOCUMENTS

| JP | 10-154101 | 6/1998 |
|---|---|---|
| JP | 2010-238138 | 10/2010 |

(Continued)

OTHER PUBLICATIONS

International Search Report issued by The International Bureau of WIPO on Jun. 24, 2014, for International Patent Application No. PCT/JP2014/057380.

*Primary Examiner* — Jared Rutz
*Assistant Examiner* — Khoa D Doan
(74) *Attorney, Agent, or Firm* — Finnegan, Henderson, Farabow, Garrett & Dunner, LLP

(57) ABSTRACT

According to one embodiment, a tiered storage system includes a high-speed storage device, a low-speed storage device, and a storage controller. The storage controller interchanges a location destination of data of a first logical chunk to which a third storage area of the low-speed storage device is allocated and a location destination of data of a second logical chunk to which a first storage area of the high-speed storage device is allocated and whose access frequency statistical value is smaller than that of the first logical chunk. The storage controller reallocates a second storage area of the high-speed storage device to a set of logical chunks to which the third storage area is allocated.

12 Claims, 11 Drawing Sheets

(56) References Cited

U.S. PATENT DOCUMENTS

| | | | |
|---|---|---|---|
| 8,584,128 B1* | 11/2013 | Don | G06F 9/5011 718/100 |
| 8,751,725 B1* | 6/2014 | Gangadharan | G06F 12/0638 711/100 |
| 8,862,849 B2* | 10/2014 | Orikasa | G06F 3/0608 710/18 |
| 8,966,211 B1* | 2/2015 | Arnon | G06F 13/102 370/338 |
| 9,047,017 B1* | 6/2015 | Dolan | G06F 3/0653 |
| 2007/0016754 A1* | 1/2007 | Testardi | G06F 3/0611 711/206 |
| 2007/0038840 A1* | 2/2007 | Hummel | G06F 12/1027 711/207 |
| 2008/0114916 A1* | 5/2008 | Hummel | G06F 13/24 710/266 |
| 2010/0250627 A1 | 9/2010 | Tabata et al. | |
| 2012/0102286 A1* | 4/2012 | Holt | G06F 3/0617 711/165 |
| 2012/0131196 A1* | 5/2012 | Yamada | G06F 11/3485 709/226 |
| 2012/0131302 A1* | 5/2012 | Nasu | G06F 3/0604 711/171 |
| 2012/0317358 A1* | 12/2012 | Ando | G06F 3/0605 711/117 |
| 2012/0323821 A1* | 12/2012 | Crk | G06Q 30/0206 705/400 |
| 2013/0066948 A1* | 3/2013 | Colrain | H04L 67/146 709/203 |
| 2013/0067161 A1* | 3/2013 | Chandra | G06F 13/12 711/114 |
| 2013/0124780 A1* | 5/2013 | Baderdinni | G06F 3/061 711/103 |
| 2013/0166614 A1 | 6/2013 | Watanabe et al. | |
| 2013/0179657 A1 | 7/2013 | Isomura et al. | |
| 2013/0297872 A1* | 11/2013 | Hyde, II | G06F 3/0611 711/117 |
| 2014/0075143 A1* | 3/2014 | Matsuya | G06F 12/02 711/170 |
| 2015/0220280 A1* | 8/2015 | Ishizaki | G06F 3/0619 711/114 |
| 2015/0373119 A1* | 12/2015 | Kaneko | H04L 67/1097 709/219 |

FOREIGN PATENT DOCUMENTS

| WO | WO 2013/098960 A1 | 7/2013 |
|---|---|---|
| WO | WO 2013/103005 A1 | 7/2013 |

\* cited by examiner

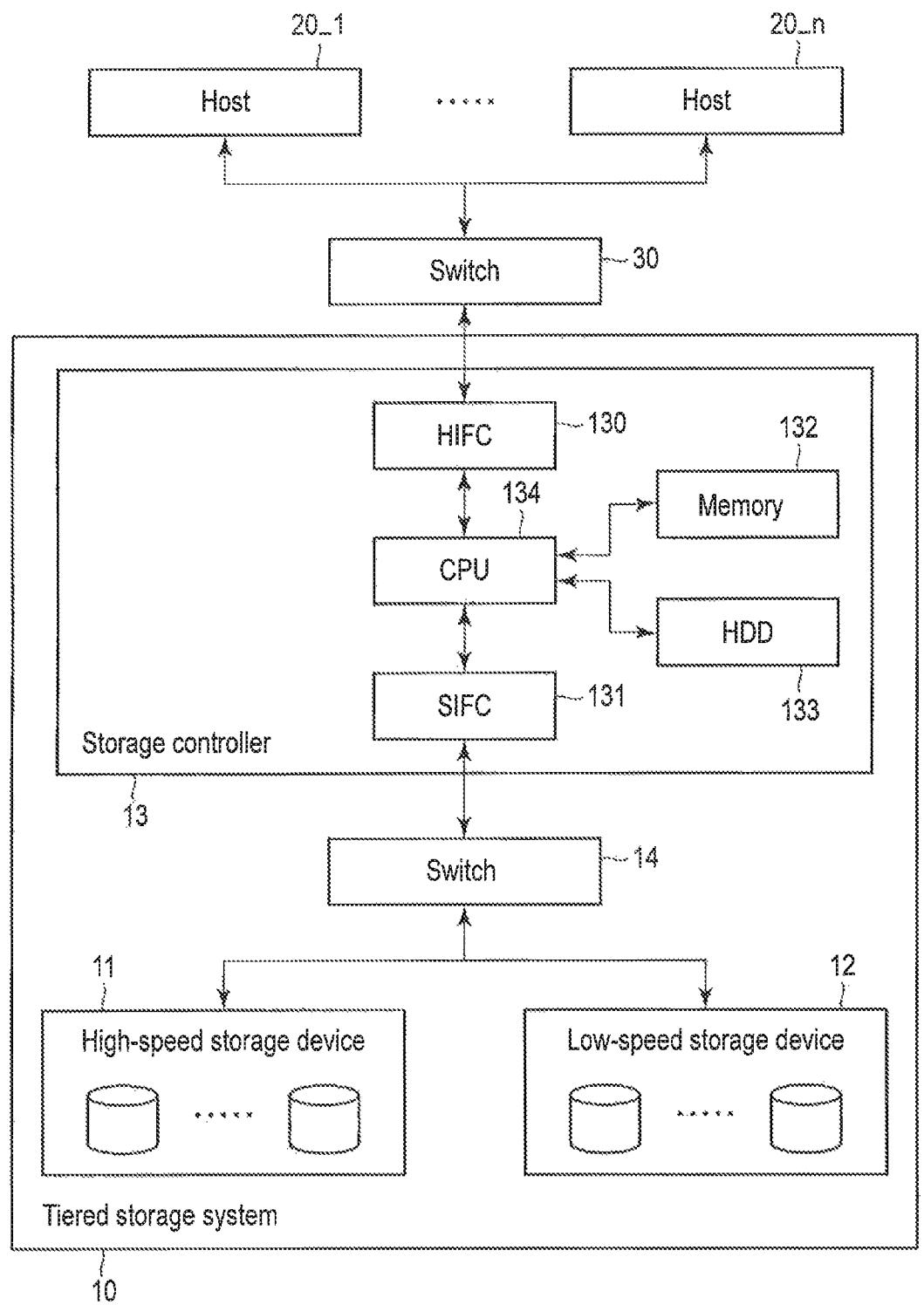
F I G. 1

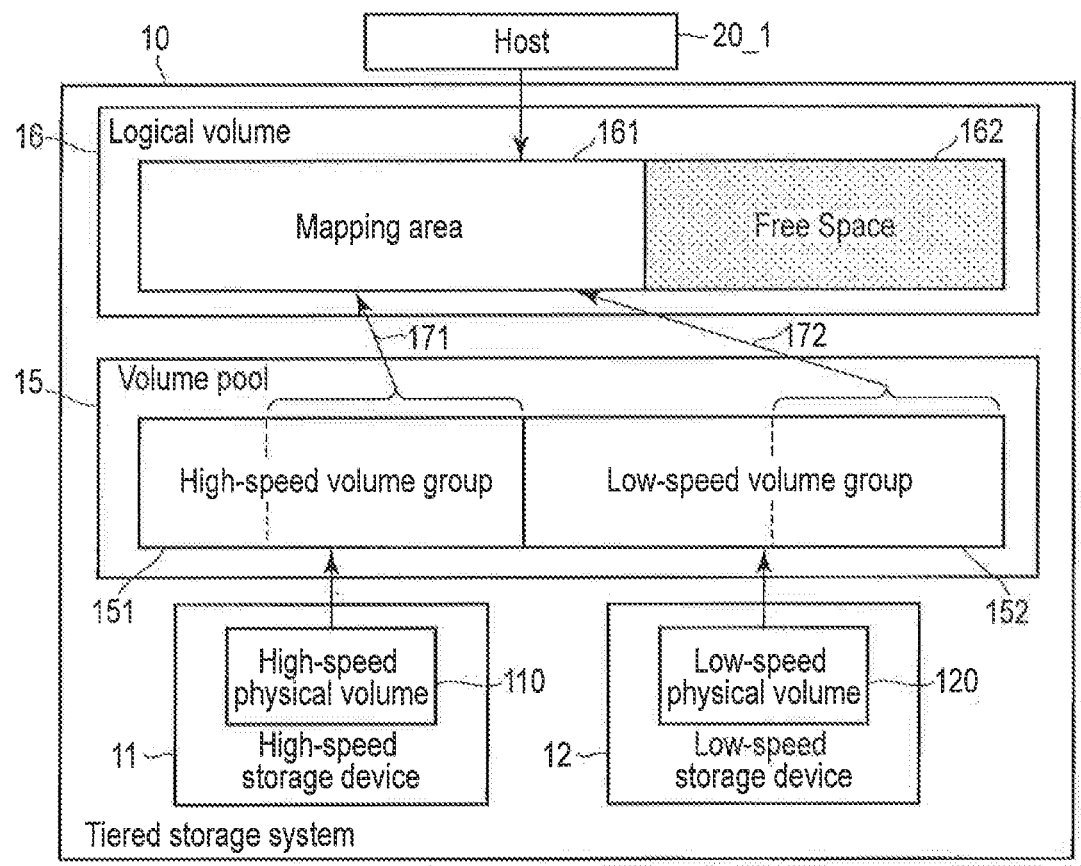
F I G. 2
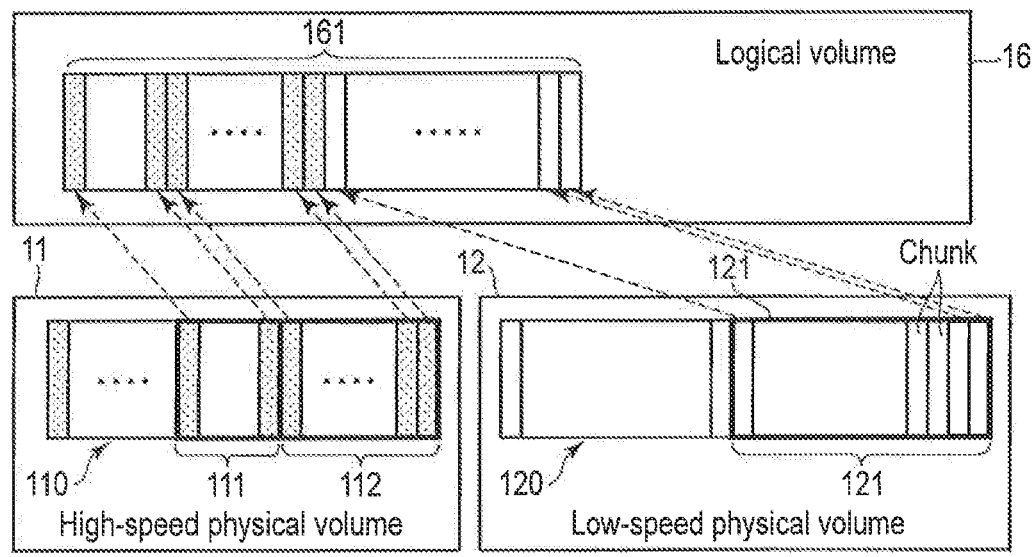
F I G. 3

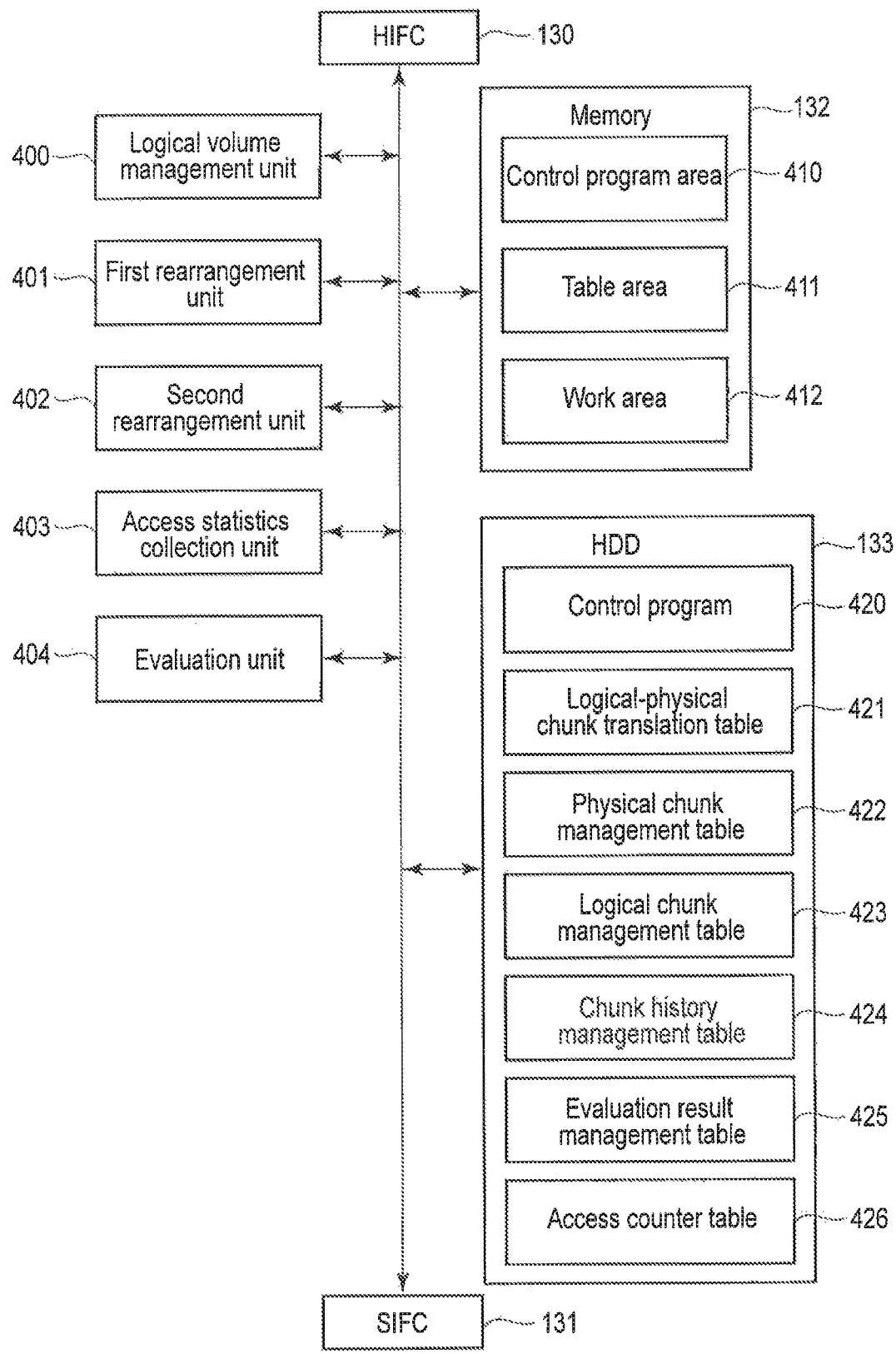
F I G. 4

421

| Logical chunk number | Physical chunk number |
|---|---|
| 0 | 1 |
| 1 | 10 |
| 2 | 12 |
| ⋮ | ⋮ |

| Physical chunk number | Physical volume ID | Sector number | Status |
|---|---|---|---|
| 1 | 1 | 0 | 1 |
| 2 | 1 | 8 | 1 |
| 3 | 1 | 16 | 0 |
| ⋮ | ⋮ | ⋮ | ⋮ |
| 10 | 2 | 0 | 0 |
| 11 | 2 | 8 | 1 |
| 12 | 2 | 16 | 0 |
| ⋮ | ⋮ | ⋮ | ⋮ |

| Logical chunk number | Logical volume ID | Sector number |
|---|---|---|
| 1 | 1 | 0 |
| 2 | 1 | 8 |
| 3 | 1 | 16 |
| ⋮ | ⋮ | ⋮ |
| 10 | 2 | 0 |
| 11 | 2 | 8 |
| 12 | 2 | 16 |
| ⋮ | ⋮ | ⋮ |

| No | Date and time | Physical chunk list | | | |
|---|---|---|---|---|---|
| 1 | 2013/10/31 12 | 8000 | 8001 | .... | 11999 |
| 2 | 2013/10/31 11 | 4000 | 4001 | .... | 7999 |
| 3 | 2013/10/31 10 | 0 | 2 | .... | 3999 |
| ⋮ | ⋮ | ⋮ | ⋮ | ⋮ | ⋮ |

| No | Date and time | Throughput [MB/s] |
|---|---|---|
| 1 | 2013/10/31 12 | xxxx |
| 2 | 2013/10/31 11 | xxxx |
| 3 | 2013/10/31 10 | xxxx |
| ⋮ | ⋮ | ⋮ |

FIG. 9

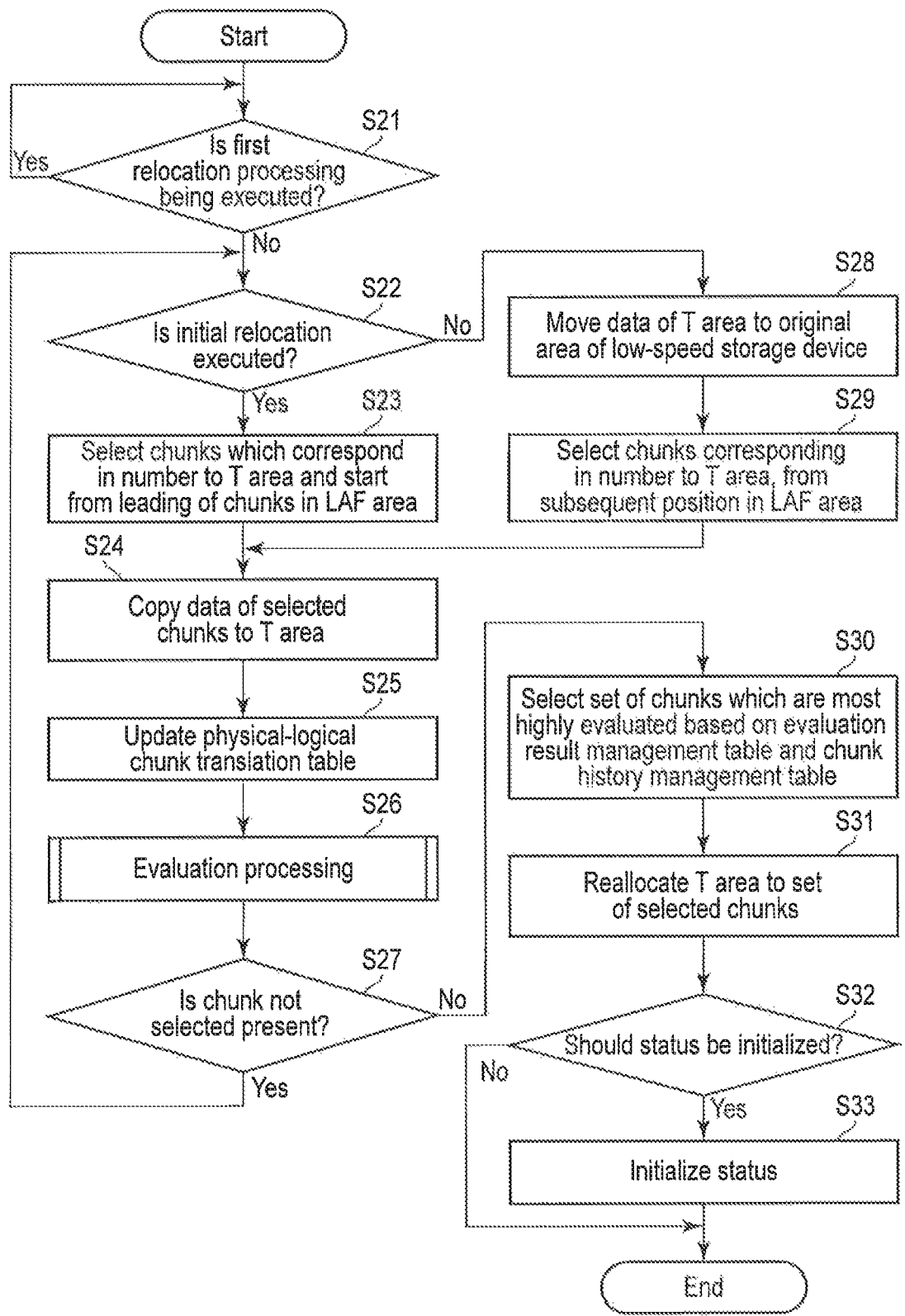
F I G. 11

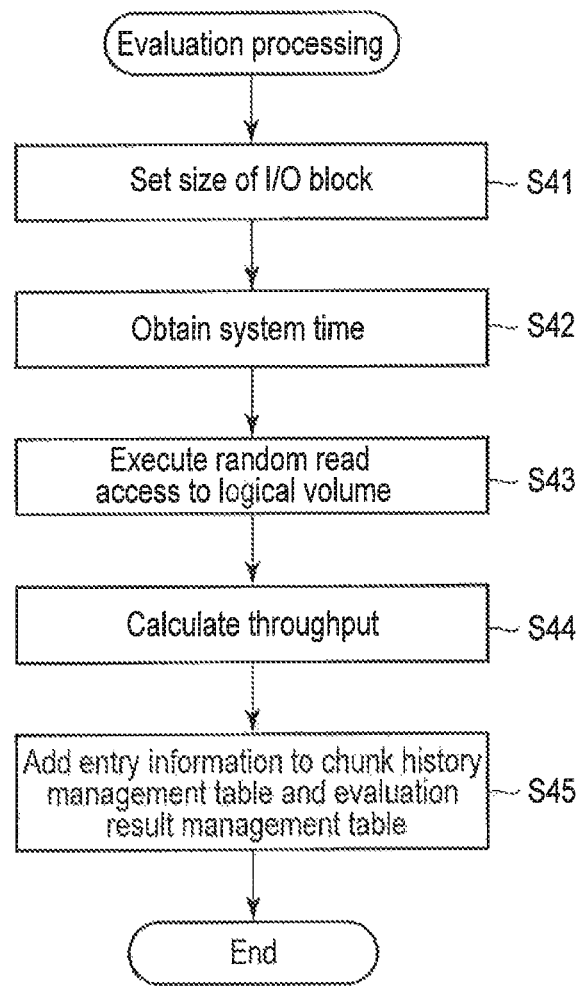
F I G. 12

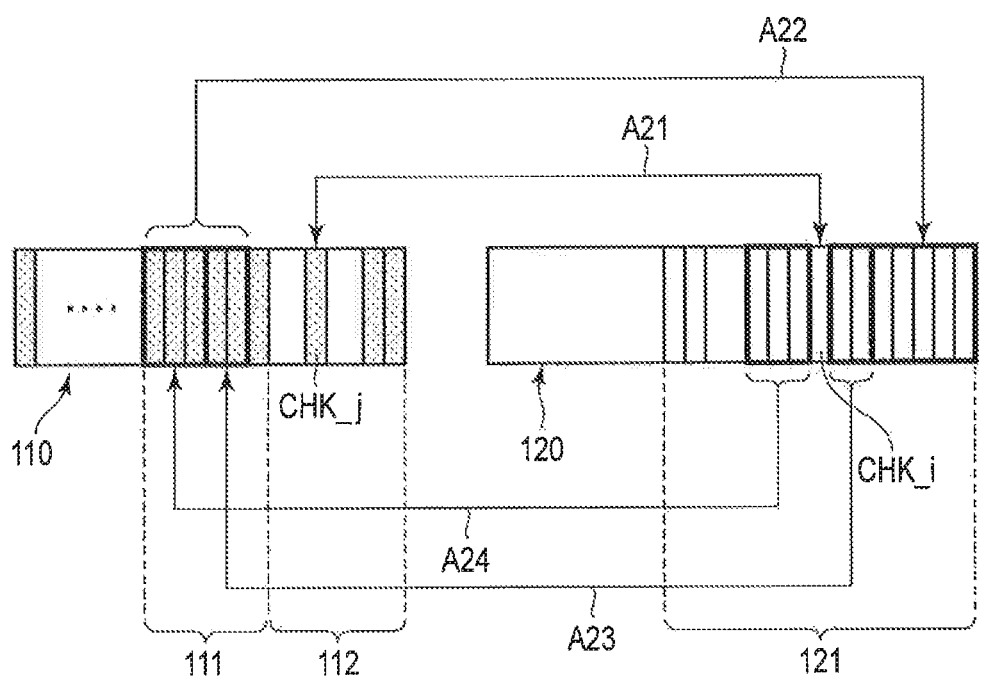
F I G. 16

TIERED STORAGE SYSTEM PROVIDED WITH TRIAL AREA, STORAGE CONTROLLER, AREA ALLOCATION METHOD AND STORAGE MEDIUM

CROSS REFERENCE TO RELATED APPLICATIONS

This application is a Continuation application of PCT Application No. PCT/JP2014/057380, filed Mar. 18, 2014, the entire contents of which are incorporated herein by reference.

FIELD

Embodiments described herein relate generally to a tiered storage system provided with a trial area, a storage controller, an area allocation method and a storage medium.

BACKGROUND

In recent years, storage systems provided with first and second storage devices having different access speeds have been developed. In this case, the first storage device has a high access speed and a small capacity, and the second storage device has a lower access speed and a larger capacity than the first storage device. The first storage device (hereinafter referred to as a high-speed storage device) and the second storage device (hereinafter referred to as a low-speed storage device) are combined together in a tiered manner, and thus the storage system is realized. Therefore, such a storage system is also referred to as a tiered storage system. In the tiered storage system, in general, the high-speed storage device and the low-speed storage device are allocated to an upper tier and a lower tier, respectively.

Furthermore, in recent years, it has been generalized that a storage area is virtualized. The same is true of the tiered storage system. In the tiered storage system, at least a part of a storage area (hereinafter referred to as a physical storage area) of each of the high-speed storage device and the low-speed storage device is allocated (mapped) to a logical volume. The logical volume means a logical storage area recognized as a logical storage drive (i.e., a logical disk or a logical unit) by a host computer (hereinafter referred to as a host) using a storage system (tiered storage system).

A high-level program such as an application, which runs under the host, accesses the logical volume, using a logical address. The logical address is translated into a physical address in the high-speed storage device or the low-speed storage device by an address translation function of, e.g., an operating system (OS) of the host or a storage controller of the storage system. Based on this physical address, a storage area in a physical volume, which is mapped to a storage area in the logical volume, is accessed. By virtue of this feature, the high-level program can access a storage area in a storage device without recognizing the storage area in the storage device.

Furthermore, in the tiered storage system, for management, the logical volume and the physical volume are each divided into a plurality of small areas having the same size. Such a small area is referred to as a chunk. In the case where chunks in the logical volume need to be distinguished from those in the physical volume, the chunks of the logical volume and those of the physical volume are referred to as logical chunks and physical chunks, respectively.

For each of chunks (e.g., logical chunks), the storage controller monitors the state of an access to each chunk. As an index indicative of the state of the above access, in general, an access frequency statistical value such as the number of times of access (i.e., the number of times of input and output corresponding to a read/write) or the total amount of accessed data, for each chunk in a given time period (monitoring period), is applied.

Based on an access frequency statistical value regarding each of logical chunks, the storage controller reallocates a physical chunk in a lower tier to a logical chunk to which a physical chunk in an upper tier is allocated, and also a physical chunk in the upper tier to a logical chunk to which a physical chunk in the lower tier is allocated. That is, the storage controller relocates data of the physical chunk in the upper tier to the physical chunk in the lower tier, and also data of the physical chunk in the lower tier to the physical chunk in the upper tier.

In accordance with the above reallocation (relocation), address translation information on the logical chunk is updated. More specifically, the physical address associated with the logical address of the logical chunk is updated to indicate the physical chunk reallocated to the logical chunk. Even after the above reallocation, the high-level program can access the above physical chunk (i.e. the reallocated physical chunk) using logical address of the logical chunk without recognizing the reallocation (i.e., without recognizing updating of the address translation information in accordance with the reallocation). Such a tiered storage system is suitable for virtualization of a storage area.

As described above, in a conventional tiered storage system, an access frequency statistical value is acquired for each of chunks, and a chunk (logical chunk) whose access frequency statistical value is great (i.e., which is great in the number of times access is made or which is large in the total amount of accessed data) is allocated to a physical chunk in the upper tier (i.e., the high-speed storage device). That is, in the conventional technique, in each of monitoring periods, a storage area of the high-speed storage device (i.e., a high-speed area) is allocated (mapped) to a logical chunk whose access frequency statistical value (access frequency) is determined great (high). By virtue of such allocation (tiered structure), it is expected that the performance of the entire tiered storage system will be improved.

In the conventional technique, a storage area of the low-speed storage device (i.e., a low-speed area) is allocated to a logical chunk whose access frequency statistical value is small. However, there is a possibility that a set of logical chunks whose access frequency statistical values are small may include a logical chunk enabling the performance of the entire tiered storage system (i.e., a system performance) to be further improved, if the high-speed area is allocated to the logical chunk.

BRIEF DESCRIPTION OF THE DRAWINGS

FIG. 1 is a block diagram showing an exemplary hardware configuration of a computer system according to an embodiment;

FIG. 2 is a view for explaining an exemplary tiered structure of a storage area in a tiered storage system shown in FIG. 1;

FIG. 3 is a view for explaining an exemplary configuration of a logical volume shown in FIG. 2;

FIG. 4 is a block diagram primarily showing an exemplary function configuration of a storage controller shown in FIG. 1;

FIG. 5 is a view showing an example of a data structure of a logical-physical chunk translation table shown in FIG. 4;

FIG. 6 is a view showing an example of a data structure of a physical chunk management table shown in FIG. 4;

FIG. 7 is a view showing an example of a data structure of a logical chunk management table shown in FIG. 4;

FIG. 8 is a view showing an example of a data structure of a chunk history management table shown in FIG. 4;

FIG. 9 is a view showing an example of a data structure of an evaluation result management table shown in FIG. 4;

FIG. 11 is a flowchart for explaining an exemplary procedure of a second relocation processing in the embodiment;

FIG. 12 is a flowchart for explaining an exemplary procedure of an evaluation processing to be executed in the second relocation processing shown in FIG. 11;

FIG. 16 is a view for explaining an outline of the second relocation processing in the modification.

DETAILED DESCRIPTION

Figure 10:
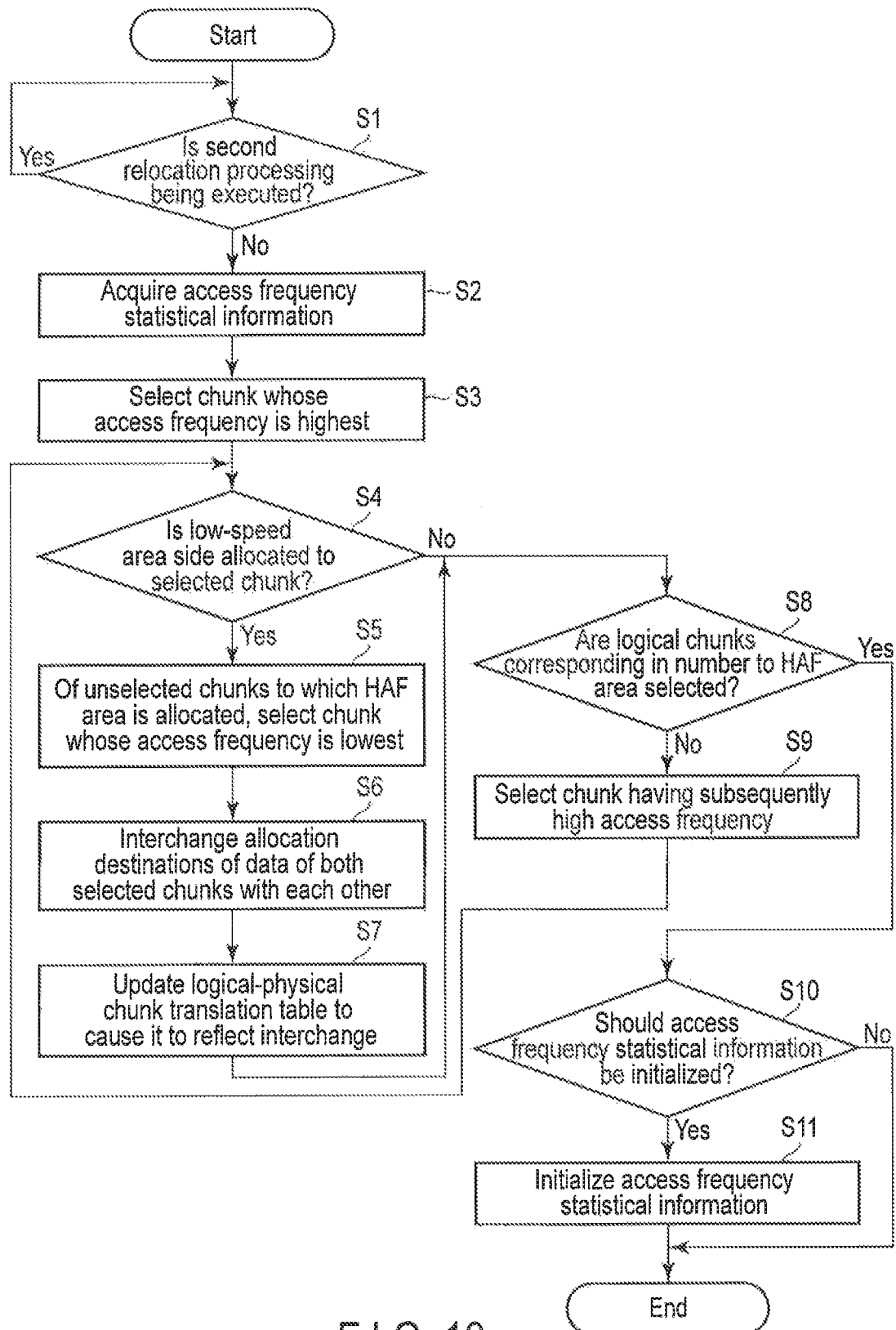
FIG. 10 is a flowchart for explaining an exemplary procedure of a first relocation processing in the embodiment.

Various embodiments will be described hereinafter with reference to the accompanying drawings.

In general, according to one embodiment, a tiered storage apparatus comprises a first storage device, a second storage device, and a storage controller. The first storage device comprises a storage area including a plurality of physical chunks each having a first size. The second storage device comprises a storage area including a plurality of physical chunks each having the first size. The second storage device has a lower access speed and a larger storage capacity than the first storage device. The storage controller is configured to control the first storage device and the second storage device, and comprises a logical volume management unit, an access statistical collection unit, a first rearrangement unit, a second rearrangement unit and an evaluation unit. The logical volume management unit is configured to manage a logical volume to which a first storage area of the first storage device, a second storage area of the first storage device and a third storage area of the second storage device are allocated in units of physical chunks. The logical volume includes a plurality of logical chunks each having the first size, and being provided to a host computer. The access statistical collection unit is configured to collect access frequency statistical values indicative of states of accesses to the plurality of logical chunks in the logical volume, respectively. The first rearrangement unit is configured to select a first logical chunk whose access frequency statistical value is great. The first rearrangement unit is further configured to reallocate a second physical chunk in the first storage area which is allocated to a second logical chunk to the first logical chunk and to reallocate a first physical chunk in the third storage area to the second logical chunk, if the first physical chunk is allocated to the first logical chunk. The second logical chunk has an access frequency statistical value smaller than that of the first logical chunk. The second rearrangement unit is configured to select a set of third logical chunks to which the second storage area is to be reallocated, if the third storage area is allocated to the set of third logical chunks. The second rearrangement unit is further configured to reallocate the second storage area to the set of third logical chunks. The valuation unit is configured to evaluate an advantage obtained by reallocating the second storage area.

FIG. 1 is a block diagram showing an exemplary hardware configuration of a computer system according to an embodiment. The computer system comprises a tiered storage system 10 and n host computers (hereinafter referred to as hosts) 20_1 to 20_n. In this embodiment, n is an integer greater than 1. That is, the computer system includes a plurality of hosts. However, n may be 1; that is, the computer system may include a single host.

The hosts 20_1 to 20_n use the tiered storage system 10 as their external storage device. The hosts 20_1 to 20_n are connected to the tiered storage system 10 (more specifically, they are connected to a storage controller 13 of the tiered storage system 10) through, for example, a switch 30 such as a switching hub (network switch). In the following explanation, in the case where the hosts 20_1 to 20_n do not need to be distinguished from each other, each of them is referred to as host 20_*.

The tiered storage system 10 comprises a high-speed storage device (first storage device) 11, a low-speed storage device (second storage device) 12 and a storage controller 13. The high-speed storage device 11 and the low-speed storage device 12 are connected to the storage controller 13 through a switch 14 of the same kind as the switch 30.

The high-speed storage device 11 comprises a flash storage device having a good access response characteristic (i.e., a high-speed access), such as a flash array. The flash storage device is made of a plurality of flash memory boards. Each of the flash memory boards includes a set of flash memories. In the embodiment, suppose each of the flash memory boards is not compatible with a hard disk drive (HDD). However, a plurality of solid-state drives (SSDs) each compatible with an HDD may be used in place of the flash memory boards.

On the other hand, the low-speed storage device 12 is formed of, for example, a hard disk drive (HDD) array having a lower access response performance (a lower access speed) and a larger storage capacity than the high-speed storage device 11 (flash storage device). The HDD array is, for example, a storage device having a RAID (redundant arrays of inexpensive disks or redundant arrays of independent disks) structure provided with a plurality of HDDs. It should be noted that each of the high-speed storage device 11 and the low-speed storage device 12 is not necessarily required to have an array structure.

As described above, the tiered storage system 10 shown in FIG. 1 includes two (two kinds of) storage devices (i.e., the high-speed storage device 111 and the low-speed storage device 112) having different access speeds (i.e., different access response functions). In this case, the high-speed storage device 111 is allocated to an upper tier (a high-speed tier referred to as a first tier), and the low-speed storage device 112 is allocated to a lower tier (a low-speed tier referred to as a second tier). The tiered storage system 10 may comprise a storage device (a storage device in a third tier referred to as a low tier) such as a magnetic-tape device, which can be accessed at a lower speed than the low-speed storage device 112.

The storage controller 13 receives a request (input/output request) of a data access (read access or write access) using a logical address, which is made by the host 20_*, and executes an input/output (I/O) requested. In the case of executing the I/O, the storage controller 13 translates, using a well-known address translation function, a logical address into a physical volume identifier (ID) and a physical address. The logical address is indicative of an address in a logical volume (logical disk) recognized by the host 20_*. The physical address is indicative of a physical position in a storage device, which is associated with the logical address. The physical volume ID is indicative of an ID of a physical volume (i.e., a physical storage area) of the storage device. The storage controller 13 accesses the high-speed storage device 11 or the low-speed storage device 12 based on the physical ID and the physical address. In the embodiment, the high-speed storage device 11 or the low-speed storage device 12 can be accessed in units of areas having a second size. The area having the second size is referred to as a block (or a sector). In the embodiment, the second size is 512 bytes (B).

The storage controller 13 comprises a host interface controller (hereinafter referred to as HIFC) 130, a storage interface controller (hereinafter referred to as SIFC) 131, a memory 132, an HDD 133 and a CPU 134.

The HIFC 130 controls a data transfer (a data transfer protocol) between the HIFC 130 and the host 20_*. The HIFC 130 receives an I/O request (a read access request or a write access request) from the host 20_* to the logical volume, and gives a reply to the I/O request. If receiving the I/O request from the host 20_*, the HIFC 130 sends the I/O request to the CPU 134. Also, if receiving the I/O request, the CPU 134 processes the I/O request.

The SIFC 131 receives from the CPU 134, an access request (a write access request or a read access request to the physical volume) based on the I/O request (the write access request or read access request to the logical volume) made from the host 20_* and received by the CPU 134. In response to the received access request, the SIFC 131 executes access to the high-speed storage device 111 or the low-speed storage device 113.

The memory 132 is a rewritable volatile memory such as a DRAM. A part of a storage area of the memory 132 is used to store a storage control program 420 (FIG. 4) to be loaded from the HDD 133. Another part of the memory 132 is used as a work area for the CPU 134. A further part of the memory 132 is used to store various tables. Such a memory map will be explained in detail later.

The HDD 133 stores the storage control program 420. When the storage controller 13 is started, the CPU 134 executes an initial program loader (IPL), and thus loads the storage control program 420 stored in the HDD 133 into the memory 132. The IPL is stored in a nonvolatile memory such as a read-only memory (ROM) or a flash ROM (FROM). Furthermore, the various tables stored in the memory 132 are saved in the HDD 133 as appropriate. The various tables saved in the HDD 133 are loaded from the HDD 133 into the memory 132 as occasion demands (for example, when the storage controller 13 is started).

The CPU 134 functions as a logical volume management unit 400, a first rearrangement unit 401, a second rearrangement unit 402, an access statistics collection unit 403 and an evaluation unit 404 in accordance with the storage control program 420 loaded into the memory 132. That is, the CPU 134 controls the entire tiered storage system 10 (especially, each element of the storage controller 13) by executing the storage control program 420 stored in the memory 132.

In the embodiment, the storage controller 13 is provided independently of the hosts 20_1 to 20_n as shown in FIG. 1. However, the storage controller 13 may be incorporated in any of the hosts 20_1 to 20_n (i.e., the host 20_*). In this case, the storage controller 13 (more specifically, the function of the storage controller 13) may be realized using a part of a function of an operating system (OS) included in the host 20_*.

Furthermore, the storage controller 13 may be provided in a card to be inserted into a card slot of the host 20_*. Also, a part of the storage controller 13 may be incorporated in the host 20_*, and the other part of the storage controller 13 may be provided in the card. In addition, the host 20_*, the storage controller 13 and at least one of the high-speed storage device 11 and the low-speed storage device 12 may be provided in a single housing.

FIG. 2 is a view for explaining an exemplary tiered structure of a storage area in the tiered storage system 10 shown in FIG. 1. The high-speed storage device 11 and the low-speed storage device 12 include physical volumes 110 and 120, respectively. In the following explanation, the physical volume 110 of the high-speed storage device 11 is referred to as a high-speed physical volume 110, and the physical volume 120 of the low-speed storage device 12 is referred to as a low-speed physical volume 120.

The high-speed physical volume 110 and the low-speed physical volume 120 are divided, for management, by the storage controller 13 into chunks (i.e., physical chunks) each having a first size. That is, each of the high-speed physical volume 110 and the low-speed physical volume 120 includes a plurality of chunks. In the embodiment, the first size (i.e., the size of each of the physical chunks) is 4 kilobytes (KB) and eight times greater than the second size (512 B). That is, 1 chunk consists of 8 sectors. Needless to say, the first size may be set to bytes other than 4 KB, for example, 4 megabytes (MB).

As shown in FIG. 2, a group of chunks in the high-speed physical volume 110 and a group of chunks in the low-speed physical volume 120 are managed using a volume pool 15. The volume pool 15 is used to logically contain (collect) the group of chunks in the high-speed physical volume 110 and the group of chunks in the low-speed physical volume 120. In the embodiment, the volume pool 15 comprises a high-speed volume group 151 and a low-speed volume group 152. The group of chunks in the high-speed physical volume 110 are collected into the high-speed volume group 151 of the volume pool 15, and the group of chunks of the low-speed storage device 12 are collected into the low-speed volume group 152 of the volume pool 15.

For example, some of the group of chunks collected into the volume pool 15 are allocated to a logical volume 16. For management, the logical volume 16 is divided by the storage controller 13 into chunks (i.e., logical chunks) having the same size (first size) as the above physical chunks. That is, the logical volume 16 comprises a plurality of chunks.

The logical volume 16 comprises a mapping area 161 and a free space 162. The mapping area 161 of the logical volume 16 are used to map (allocate) a group of chunks selected (collected) from the high-speed volume group 151 and the low-speed volume group 152 of the volume pool 15 as indicated in arrows 171 and 172 in FIG. 2. The free space 162 means an area to which no physical chunk is allocated.

The state of the logical volume 16 can be recognized by the host 20_* via the storage controller 13. More specifically, the host 20_* can recognize the logical volume 16, to which physical chunks of the high-speed storage device 11 and physical chunks of the low-speed storage device 12 are allocated, as a single logical disk. Also, when the host 20_* accesses the logical volume 16 using the logical address, it can access a physical storage area mapped to a logical storage area designated by a logical address without recognizing the physical storage area.

Thus, the storage controller 13 (more specifically, the logical volume management unit 400 of the storage controller 13) manages, using a logical-physical chunk translation table 421 (FIG. 4), correspondence between respective logical chunks in the logical volume 16 and physical chunks mapped to the respective logical chunks. Information held in each of entries in the logical-physical chunk translation table 421 is a kind of address translation information. If receiving an I/O request for a read access or write access, which is sent from the host 20_*, the storage controller 13 translates a logical address designated by the I/O request into a physical volume ID and a physical address based on the logical-physical chunk translation table 421 (in addition, a physical chunk management table 422 to be described later). Based on the physical volume ID and the physical address, the storage controller 13 accesses the high-speed storage device 11 (the high-speed physical volume 110) or the low-speed storage device 12 (the low-speed physical volume 120), i.e., a storage (physical storage area) of a physical layer.

In the embodiment, data is moved in units of chunks between a first set and a second set allocated to the mapping area 161 of the logical volume 16. More specifically, data is moved in units of chunks between the high-speed storage device 11 (the high-speed physical volume 110) and the low-speed storage device 12 (the low-speed physical volume 120). This movement of data is executed under a control of the storage controller 13. Such data movement can be performed by the storage controller 13 without causing the host 20_* to recognize it, as long as the logical-physical chunk translation table 421 is correctly updated.

FIG. 3 is a view for explaining an exemplary structure of the logical volume 16 shown in FIG. 2. It should be noted that in FIG. 3, the free space 162 of the logical volume 16 is omitted. As shown in FIG. 3, some of a set of chunks allocated to the mapping area 161 of the logical volume 16 are present as a set of chunks in the high-speed physical volume 110 (which will be hereinafter referred to as a first set), and the others of the above set of chunks are present as a set of chunks in the low-speed physical volume 120 (which will be hereinafter referred to as a second set).

In a conventional technique, a storage area in a high-speed physical volume 110, which is allocated to the logical volume 16 (i.e., an area of the first set) is used to store data of logical chunks, for example, whose access frequency statistical values (access frequencies) are great (high). Such a storage area in the high-speed physical volume 110 is referred to as a high access frequency area.

On the other hand, in the embodiment, a storage area in the high-speed physical volume 110 which is allocated to the logical volume 16, as shown in FIG. 3, includes two storage areas, i.e., a trial area (hereinafter referred to as a T area) 111 and a high access frequency area (hereinafter referred to as a HAF area) 112. The HAF area (first storage area) 112 is applied to allocation to a set of logical chunks whose access frequency statistical values are great, as in the conventional technique. That is, as a requirement for logical chunks to which the HAF area 112 is to be allocated (which will be hereinafter referred to as a first requirement), it is required that the access frequency statistical value is great.

On the other hand, the T area (second storage area) 111 is applied to reallocation to a set of logical chunks selected based on a criterion different from the access frequency statistical value, and also to evaluation of an advantage obtained by the above reallocation. In the embodiment, a set of logical chunks to which the T area 111 is to be reallocated are selected from a group of logical chunks in the logical volume 16 to which a storage area 121 (i.e., an area of a second set) in the low-speed physical volume 120 is allocated.

That is, as a requirement for logical chunks to which the T area 111 is to be reallocated (which will be hereinafter referred to as a second requirement), it is required that at least the storage area (third storage area 121 in the low-speed physical volume 120 is allocated. More specifically, as the second requirement, it is required that the storage area 121 in the low-speed physical volume 120 is allocated, and the T area 111 is not allocated. The storage area 121 in the low-speed physical volume 120 is used to store data of logical chunks, whose access frequency statistical values (access frequencies) are small (low), of a group of logical chunks in the mapping area 161 of the logical volume 16. The storage area 121 will be referred to as a low access frequency area (hereinafter referred to as a LAF area) 121.

The storage controller 13 (more specifically, the logical volume management unit 400 of the storage controller 13) prepares the logical volume 16 based on a request for preparation of a logical volume, which is made from the host 20_* or which is made from the user via a user interface of the storage controller 13. In the case of preparing the logical volume 16, the storage controller 13 prepares the volume pool 15, which includes the high-speed physical volume 110 of the high-speed storage device 11 and the low-speed physical volume 120 of the low-speed storage device 12. As described above, the volume pool 15 comprises the high-speed volume group 151 and the low-speed volume group 152.

In response to the request for preparation of a logical volume, the storage controller 13 cuts a first set of chunks and a second set of chunks from the high-speed volume group 151 and the low-speed volume group 152, respectively, and allocate them to the mapping area 161 of the logical volume 16.

The ratio between the mapping area 161 and the free space 162 in the logical volume 16 can be specified from the host 20_* (or the user). Also, the ratio between the first set and the second set allocated to the mapping area 161 can be specified from the host 20_* (or the user). Furthermore, the ratio between the T area 111 and the HAF area 112 in the high-speed physical volume 110 can be specified from the host 20_* (or the user), and a storage capacity of the entire logical volume 16 can be specified from the host 20_* (or the user) to fall within a range not exceeding a predetermined upper limit.

FIG. 4 is a block diagram primarily showing an exemplary function configuration of the storage controller 13 shown in FIG. 1. The storage controller 13 comprises the logical volume management unit 400, the first rearrangement unit 401, the second rearrangement unit 402, the access statistics collection unit 403 and the evaluation unit 404. Those function elements 400 to 404 are software modules which can be achieved by executing the storage control program 20 with the CPU 134 of the storage controller 13 shown in FIG. 1. However, at least one of the function elements 400 to 404 may be achieved as a hardware module.

The memory 132 includes the control program area 410, the table area 411 and the work area 412. The control program area 410 is used to store at least a part of the storage control program 420 executed by the CPU 134. The storage control program 420, as described above, is stored in the HDD 133 in advance, and at least the above part of the storage control program 420 is loaded from the HDD 133 into the control program area 410 at the time of starting the storage controller 13.

The table area 411 is used to store at least some of various tables stored in the HDD 133. The work area 412 is used to store temporary data used when the CPU 134 executes the storage control program 420.

In addition to the storage control program 420, the HDD 133 stores the logical-physical chunk translation table 421, the physical chunk management table 422, a logical chunk management table 423, a chunk history management table 424, an evaluation result management table 425 and an access counter table 426. Those tables 421 to 426 are used after being loaded from the HDD 133 into the table area 411 of the memory 132, for example, at the time of booting the storage controller 13. Thus, if a table or tables loaded into the memory 132 are updated, this update is reflected as appropriate in a corresponding table or tables in the HDD 133. However, in the following explanation, in order that it be simplified, suppose the tables 421 to 426 are used in a state in which they are stored in the HDD 133.

FIG. 5 shows an example of a data structure of the logical-physical chunk translation table 421 shown in FIG. 4. The logical-physical chunk translation table 421 has entries associated with the respective logical chunks of the logical volume 16 shown in FIG. 2. Each of the entries of the logical-physical chunk translation table 421 is used to hold a respective combination of a logical chunk number and a physical chunk number. The logical chunk number is indicative of a respective logical chunk (i.e., a respective one of the logical chunks in the logical volume 16). The physical chunk number is indicative of a physical chunk to which the respective logical chunk is allocated.

In the embodiment, the tiered storage system 10 comprises a plurality of logical volumes including the logical volume 16. However, in FIG. 2, logical volumes other than the logical volume 16 are omitted as the figure is limited in space. In such a manner, in the embodiment, the tiered storage system 10 comprises a plurality of logical volumes. In addition, a plurality of logical-physical chunk translation tables including the logical-physical chunk translation table 421 shown in FIG. 5 are prepared in association with the plurality of logical volumes, respectively. However, a single logical-physical chunk translation table may be used in place of the plurality of logical-physical translation tables, if it is prepared to include entry information having a logical volume ID. The logical volume ID is indicative of a logical volume including a logical chunk indicated by the logical chunk number held in a respective entry. The tiered storage system 10 may comprise the logical volume 16 only.

FIG. 6 shows an example of a data structure of the physical chunk management table 422 shown in FIG. 4. The physical chunk management table 422 has entries associated with the respective physical chunks collected in the volume pool 15. Each of the entries of the physical chunk management table 422 is used to hold a respective combination of a physical chunk number, a physical volume ID, a sector number and a status (status flag).

The physical chunk number is indicative of a respective physical chunk. The physical volume ID is indicative of a physical volume including the respective physical chunk. In the embodiment, the physical chunk number is unique regardless of to which physical volume (storage device) the respective physical chunk belongs. However, the physical chunk number may be set unique only in a physical volume to which the respective physical chunk belongs. In this case, it suffices that the entry information of the logical-physical chunk translation table 421 is made to include a physical volume ID in addition to the logical chunk number and the physical chunk number. The physical volume ID is indicative of a physical volume to which a physical chunk allocated to the respective logical chunk belongs.

Next, the sector number is indicative of a leading one of a sequence of sectors constituting the respective physical chunk. The status is indicative of whether a physical chunk in the T area 111 was allocated to a logical chunk to which the respective physical chunk is allocated (status=1) or not (status=0).

FIG. 7 shows an example of a data structure of the logical chunk management table 423 shown in FIG. 4. The logical chunk management table 423 includes entries associated with all logical chunks included in a plurality of logical volumes (more specifically, a plurality of logical volumes including the logical volume 16) provided in the tiered storage system 10. Each of the entries of the logical chunk management table 423 is used to hold a combination of a logical chunk number, a logical volume ID and a sector number. The logical chunk number is indicative of a respective logical chunk. The logical volume ID is indicative of a logical volume including the respective logical chunk. The sector number is indicative of a leading one of a sequence of sectors constituting the respective logical chunk.

FIG. 8 shows an example of a data structure of the chunk history management table 424 shown in FIG. 4. The chunk history management table 424 is used to manage histories of a second relocation processing (which will be hereinafter referred to as chunk histories). The second relocation processing is processing for reallocating (associating) physical chunks in the T area 111 in the high-speed physical volume 110 to logical chunks associated with physical chunks in the LAF area 121 in the low-speed physical volume 120. The second relocation processing includes a processing for evaluating an advantage of the above reallocation.

The chunk history management table 424 includes entries associated with the chunk histories (second histories). Each of the entries of the chunk history management table 424 is used to hold a respective combination of a chunk history number, date and time information and a physical chunk list. The chunk history number is indicative of the order in which chunk histories were acquired; that is, the chunk history numbers are indicative of ordinal numbers in the order. In the embodiment, the smaller the chunk history number, the newer the acquired chunk history. The date and time information is indicative of a date and time at which an associated chunk history was acquired. The physical chunk list is indicative of a set of physical chunks in the LAF area 121, which have been associated with logical chunks to which a set of physical chunks in the T area 111 are reallocated by an associated second relocation processing. In the embodiment, the T area 111 comprises 4000 physical chunks. Therefore, the physical chunk list is indicative of a set of 4000 physical chunks.

FIG. 9 shows an example of a data structure of the evaluation result management table 425 shown in FIG. 4. The evaluation result management table 425 is used to manage histories of results (evaluation results) of an evaluation processing executed in the second relocation processing at the time of acquiring the chunk histories.

The evaluation result management table 425 includes entries associated with the histories (first histories) of the evaluation results. Each of the entries of the evaluation result management table 425 is used to hold a respective combination of a evaluation result number, date and time information and throughput information. The evaluation result number is indicative of the order in which evaluation results (histories of evaluation results) were acquired; that is, the evaluation result numbers are indicative of ordinal numbers in the order, and conform to the chunk history numbers of associated chunk histories. In the embodiment, the smaller the evaluation result number, the newer the evaluation result acquired. The date and time information is indicative of a date and time at which an associated evaluation result (chunk history) is acquired. The throughput information is indicative of an associated evaluation result. In the embodiment, as the associated evaluation result, a throughput is applied. The throughput will be described later.

Next, a first relocation processing in the embodiment will be explained with reference to FIG. 10. FIG. 10 is a flowchart for explaining an exemplary procedure of the first relocation processing, which is executed by the storage controller 13 (more specifically, the first rearrangement unit 401 of the storage controller 13). The first relocation processing includes a processing in which for example, in a first time period (monitoring period), access frequency statistical information (access frequency statistical value) is acquired for each of chunks (e.g., logical chunks). The first relocation processing further includes a processing in which based on the acquired access frequency statistical value, a physical chunk (physical chunks) in the HAF area 112 of the high-speed physical volume 110 is reallocated to a logical chunk (logical chunks) having a high access frequency. The first relocation processing is periodically executed, for example, at intervals each corresponding to the first time period.

In the embodiment, the first relocation processing and the second relocation processing are executed independently. Thus, the first relocation processing and the second relocation processing are executed exclusive of each other. That is, while one of those relocation processings is being executed, the other is in a standby state, and leaves the standby state after the above executed relocation processing is completed.

Thus, the first rearrangement unit 401 of the storage controller 13 first determines whether the second relocation processing is being executed or not (step S1). If the second relocation processing is being executed (Yes in step S1), the first rearrangement unit 401 awaits completion of the second relocation processing.

On the other hand, if the second relocation processing is not being executed (No in step S1), the first rearrangement unit 401 boots the access statistics collection unit 403. Then, the access statistics collection unit 403 monitors an access to each of the logical chunks in the first time period, and also acquires, e.g., a frequency of accesses to each of the logical chunks (step S2). More specifically, the access statistics collection unit 403 acquires a frequency of accesses to each of the logical chunks, as access frequency statistical information (access frequency value), using the access counter table 426. The frequency of accesses to each logical chunk is an index indicative of the state of the accesses to each logical chunk. Each of the entries of the access counter table 426 is used to hold an access count indicative of the number of times an associated logical chunk is accessed (e.g., the sum of the number of times a data read is performed and that a data write is performed). The access count is incremented by 1 each time the associated logical chunk is accessed. The access statistics collection unit 403 may acquire the total amount of data on the accesses to each logical chunk as access frequency statistical information.

When the monitoring period elapses, i.e., when the access frequency statistical information is acquired by the access statistics collection unit 403 (step S2), the first rearrangement unit 401 selects a logical chunk whose access frequency is the highest, i.e., a logical chunk whose access account (access frequency statistical value) is the greatest, based on the access frequency statistical information (the access counter table 426) (step S3). Then, the first rearrangement unit 401 determines whether a physical chunk in the low-speed physical volume 120 (LAF area 121) is allocated to the selected logical chunk (hereinafter referred to as the first logical chunk) in the following manner (step S4).

First, the first rearrangement unit 401 refers to the logical-physical chunk translation table 421 based on the logical chunk number of the first logical chunk. Then, the first rearrangement unit 401 specifies the physical chunk number of a physical chunk associated with the first logical chunk. Next, the first rearrangement unit 401 refers to the physical chunk management table 422 based on the specified physical chunk number. Also, the first rearrangement unit 401 specifies a physical volume ID indicated in combination with the specified physical chunk number. Based on the specified physical volume ID, the first rearrangement unit 401 determines whether a physical chunk in the low-speed physical volume 120 (i.e., a low-speed area side) is allocated to the first logical chunk.

If the physical chunk in the low-speed physical volume 120 is allocated to the first logical chunk (Yes in step S4), the first rearrangement unit 401 proceeds to step S5. In step S5, from unselected logical chunks to which the HAF area 112 (more specifically, physical chunks in the HAF area 112) is allocated, the first rearrangement unit 401 selects a logical chunk whose access frequency is the lowest, i.e., whose access count (access frequency statistical value) is the smallest, in the following manner. First, the first rearrangement unit 401 refers to the physical chunk management table 422 based on the physical volume ID of the high-speed physical volume 110 including the HAF area 112. The first rearrangement unit 401 thereby specifies physical chunk numbers indicated in combination with the physical volume ID of the high-speed physical volume 110. Then, the first rearrangement unit 401 refers to the logical-physical chunk translation table 421, and thus specifies logical chunk numbers of unselected logical chunks, which are combined with the specified physical chunk numbers. Then the first rearrangement unit 401 refers to the access counter table 426, and thus selects a logical chunk whose access frequency is the lowest (which will be hereinafter referred to as a second logical chunk), from the unselected logical chunks indicated by the specified logical chunk numbers.

Next, the first rearrangement unit 401 interchanges location destinations of data of the first logical chunk and the second logical chunk (i.e., both the selected chunks) with each other (step S6). More specifically, the first rearrangement unit 401 interchanges data of a physical chunk (hereinafter referred to a first physical chunk) in the LAF area 121, which is allocated to the first logical chunk, and data of a physical chunk (hereinafter referred to as a second physical chunk) in the HAF area 112, which is allocated to the second logical chunk, with each other. That is, the first rearrangement unit 401 relocates the data of the first logical chunk to the second physical chunk, and also the data of the second logical chunk to the first physical chunk.

Next, based on an interchange of the above location destinations of the data (relocation of the data), the first rearrangement unit 401 updates information in entries of the logical-physical chunk translation table 421, which are associated with the first logical chunk and the second logical chunk, respectively (step S7). That is, the first rearrangement unit 401 updates the information in the entries in the logical-physical chunk translation table 421, which are associated with the first and second logical chunks, such that the interchange of the location destinations of the above data is reflected in the information. More specifically, the first rearrangement unit 401 updates a physical chunk number in the entry in the logical-physical chunk translation table 421, which is associated with the first logical chunk, from a number indicative of the first physical chunk to a number indicative of the second physical chunk. Similarly, the first rearrangement unit 401 updates a physical chunk number in the entry in the logical-physical chunk translation table 421, which is associated with the second logical chunk, from a number indicative of the second physical chunk to a number indicative of the first physical chunk.

After executing step S7, the first rearrangement unit 401 proceeds to step S8. Also, if no physical chunk in the low-speed physical volume 120 is allocated to the first logical chunk (No in step S4), the first rearrangement unit 401 proceeds to step S8. In step S8, the first rearrangement unit 401 determines whether logical chunks corresponding in number to the HAF area 112 are selected. The logical chunks corresponding in number to the HAF area 112 mean logical chunks the number of which is equal to that of physical chunks constituting the HAF area 112.

If the logical chunks corresponding in number to the HAF area 112 are not selected (No in step S8), the first rearrangement unit 401 proceeds to step S9. In step S9, the first rearrangement unit 401 selects a logical chunk whose access frequency is subsequently high, as the second logical chunk, based on the access counter table 426. Then, the first rearrangement unit 401 returns to step S4.

In such a manner, the first rearrangement unit 401 interchanges the destination of data of a logical chunk, whose access frequency is high, of logical chunks to which physical chunks in the LAF area 121 are allocated, and the destination of data of a logical chunk, whose access frequency is low, of logical chunks allocated to the HAF area 112, with each other. Then, if local chunks corresponding in number to the HAF area 112 are selected (Yes in step S8), the first rearrangement unit 401 proceeds to seep S10. In step S10, the first rearrangement unit 401 determines whether initialization of the access frequency statistical information (that is, the access counter table 426) is designated by the user with the user interface.

If the above initialization is designated (Yes in step S10), the first rearrangement unit 401 initializes the access frequency statistical information (step S10), and ends the first relocation processing. On the other hand, if the initialization is not designated (No in step S10), the first rearrangement unit 401 skips over step S10, and ends the first relocation processing. The first relocation processing, as described above, is periodically executed at intervals each corresponding to the first time period.

For simplification, the above explanation is given with respect to the case where the access frequency of the first logical chunk is necessarily higher than that of the second logical chunk. However, actually, there can be a case where the access frequency of the first logical chunk is lower than that of the second logical chunk. In such a case, the first rearrangement unit 401 skips over steps S6 to S8, and proceeds to step S10.

Next, the second relocation processing to be applied to the embodiment will be explained with reference to FIGS. 11 and 12. FIG. 11 is a flowchart for explaining an exemplary procedure of the second relocation processing to be executed by the storage controller 13 (more specifically, the second rearrangement unit 402 of the storage controller 13). FIG. 12 is a flowchart for explaining an exemplary procedure of an evaluation processing to be executed in the second relocation processing shown in FIG. 11.

The second rearrangement unit 402 of the storage controller 13 first determines whether the first relocation processing is being executed (step S21). If the first relocation processing is being executed (Yes in step S21), the second rearrangement unit 402 awaits completion of the first relocation processing. On the other hand, if the first relocation processing is not being executed (No in step S21), the second rearrangement unit 402 proceeds to step S22. In step S22, the second rearrangement unit 402 determines whether initial relocation (reallocation) in the second relocation processing is executed.

If the initial relocation in the second relocation processing is executed (Yes in step S22), the second rearrangement unit 402 proceeds to step S23. In such a manner, if the initial relocation is executed, in the embodiment, no physical chunks in the T area 111 are allocated to the logical chunks. In step S23, for example, the second rearrangement unit 402 selects Q physical chunks which correspond in number to the T area 111 and start from a leading one of the physical chunks in the LAF area 121. "Q" means the number of physical chunks constituting the T area 111. In this case, the T area 111 contains 4,000 physical chunks, and thus Q is 4,000.

Next, the second rearrangement unit 402 copies data of the selected Q physical chunks (hereinafter referred to as third physical chunks) to the T area 111 (step S24). Then, based on the copying, the second rearrangement unit 402 updates information in the entries of the logical-physical chunk translation table 421 (step S25). That is, in the logical-physical chunk translation table 421, the second rearrangement unit 402 changes logical chunk numbers associating the selected Q third physical chunks. More specifically, in the logical-physical chunk translation table 421, the second rearrangement unit 402 updates physical chunk numbers associating to Q logical chunks (hereinafter referred to as third logical chunks) with which the selected Q third physical chunks have been associated, from numbers indicative of the third physical chunks to numbers indicative of Q physical chunks (hereinafter referred to as fourth physical chunks) in the T area 111. In such a manner, the second rearrangement unit 402 performs reallocation of physical chunks by associating the Q fourth physical chunks in the T area 111 to the Q third logical chunks associated with the selected Q third physical chunks, respectively. Furthermore, in step S25, the second rearrangement unit 402 sets statuses in the entries in the physical chunk management table 422, which are associated with the third physical chunks, to 1.

After step S25, the second rearrangement unit 402 starts the evaluation unit 404. Then, the evaluation unit 404 evaluates an advantage obtained by copying (step S24) of data of physical chunks from the LAF area 121 to the T area 111. That is, in accordance with the flowchart shown in FIG. 12, the evaluation unit 404 evaluates an advantage obtained by reallocation in which physical chunks to be allocated to the selected logical chunks are changed from physical chunks in the LAF area 121 to physical chunks in the T area 111, in the following manner (step S26).

First, the evaluation unit 404 sets the size (second size) of a block (I/O block) (step S41). As described above, each of the high-speed storage device 11 and the low-speed storage device 12 can be accessed in units of blocks; that is, the minimum unit is the block. Next, the evaluation unit 404 obtains present time (i.e., system time) from a system clock provided in the tiered storage system 10 (the storage controller 13) (step S42).

Next, the evaluation unit 404 executes a random read access to the logical volume 16 (step S43). The evaluation unit 404 calculates a throughput [MB/s] in the random read access based on time [s] from a starting point of the random read access to an ending point thereof and the amount of data [MB] read in the random read access (step S44). Then, the evaluation unit 404 adds entry information to the chunk history management table 424 and the evaluation result management table 425 as follows (step S45).

First, the evaluation unit 404 generates entry information (chunk history information) including a chunk history number (=1), date and time information indicative of the system time (date and time) obtained in step S42 and physical chunk numbers of the Q third physical chunks selected in step S23. It should be noted that in the chunk history management table 424, one or more effective entries (for example, a plurality of entries) are present. In this case, the first rearrangement unit 401 transfers chunk history information of the plurality of entries to subsequent entries, and increments a chunk history number in the chunk history information of each of the entries by 1. Then, the evaluation unit 404 sets the generated chunk history information to a leading entry in the chunk history management table 424. It should be noted that it may be set that chunk history numbers are sequentially prepared in accordance with generation of associated chunk history information, and i-th generated chunk history information is held in an i-th entry in the chunk history management table 424 (i=1, 2, 3, . . . ).

Furthermore, the evaluation unit 404 generates entry information (evaluation result information) including an evaluation result number (=1), date and time information indicative of the system time (date and time) obtained in step S42 and throughput information indicative of a throughput calculated in step S44. The evaluation unit 404 adds the generated evaluation result information to the evaluation result management table 425 in the same manner as it adds the chunk history information to the chunk history management table 424. After executing step S45, the evaluation unit 404 ends the evaluation processing (step S26).

Then, the second rearrangement unit 402 determines whether the LAF area 121 contains a physical chunk or chunks not selected (i.e., a physical chunk or chunks not selected in step S23) (step S27). If it contains a physical chunk or chunks not selected (Yes in step S27), the second rearrangement unit 402 returns to step S22. In step S22, the second rearrangement unit 402, as described above, determines whether the initial relocation in the second relocation processing is executed.

As in the above example, if relocation other than the initial relocation is executed (No in step S22), the second rearrangement unit 402 proceeds to step S28 for subsequent relocation. In step S28, the rearrangement unit 402 moves data of all the physical chunks in the T area 111 (i.e., the Q fourth physical chunks) to an original area of the low-speed storage device 12. The original area means an area of Q physical chunks (hereinafter referred to as fifth physical chunks) in the LAF area 121, in which data is stored before the data is copied to the Q physical chunks in the T area 111 in latest step S24, i.e., an area from which data is copied in latest step S24. The original area in the LAF area 121 (i.e., a destination of data to be moved in step S28) is specified based on a list of chunks in a leading entry (i.e., an entry in which the chunk history number is 1) of the chunk history management table 424. In such a manner, in step S28, the second rearrangement unit 402 reallocates the original area in the LAF area 121 to Q logical chunks (hereinafter referred to as fourth logical chunks) to which the Q fourth physical chunks in the T area 111 are presently allocated.

Next, the second rearrangement unit 402 selects Q physical chunks from a subsequent position in the LAF area 121 (step S29). The subsequent position in the LAF area 121 means a position subsequent to the area to which the data of the T area 111 is moved in step S28. Then, the second rearrangement unit 402 executes steps S24 and S25 as in step S23 in the initial relocation, in the following manner.

First, the second rearrangement unit 402 copies (relocates) data of Q physical chunks (hereinafter referred to as third physical chunks) selected in step S29 to the T area 111 (step S24). That is, the second rearrangement unit 402 reallocates Q physical chunks (hereinafter fourth physical chunks) in the T area 111 to Q logical chunks (hereinafter third logical chunks) associated with the Q third physical chunks selected in step S29.

Next, based on the above copying (reallocation), the second rearrangement unit 402 updates information in entries in the logical-physical chunk translation table 421, which are associated with the selected Q third physical chunks (i.e., information in entries in the logical-physical chunk translation table 421, which are associated with the Q third logical chunks) (step S25). More specifically, the second rearrangement unit 402 updates the physical chunk numbers in the entries in the logical-physical chunk translation table 421, which are associated with the Q third logical chunks, from numbers indicative of the third physical chunks to numbers indicative of the fourth physical chunks. Also, in step S25, the second rearrangement unit 402 updates information in the entries in the logical-physical chunk translation table 421, which are associated with the Q fourth logical chunks to which the Q fourth physical chunks have been allocated. More specifically, the second rearrangement unit 402 updates the physical chunk numbers in the entries in the logical-physical chunk translation table 421, which are associated with the Q fourth logical chunks, from numbers indicative of the fourth physical chunks to numbers indicative of the fifth physical chunks.

As a result, if, for example, fourth relocation is executed, data of all the physical chunks in the T area 111 is moved to physical chunks 8,000 to 11,999 (i.e., physical chunks whose physical chunk numbers are 8,000 to 11,999) in the LAF area 121, which are indicated by the physical chunk list in the leading entry in the chunk history management table 424 shown in FIG. 8 (step S28). That is, the physical chunks 8,000 to 11,999 are reallocated to 4,000 logical chunks to which 4,000 physical chunks in the T area 111 have been allocated.

Next, data of physical chunks 12,000 to 15,999 in the LAF area 121 (i.e., physical chunks whose physical chunk numbers are 12,000 to 15,999) is copied to the T area 111 (steps S29 and S24). That is, 4,000 physical chunks in the T area 111 are reallocated to 4,000 logical chunks to which the physical chunks 12,000 to 15,999 in the LAF area 121 have been allocated. Then, steps S26 and 27 are re-executed.

The second rearrangement unit 402 repeats steps S22, S28, S29 and S24-S27. Then, if the physical chunks in the LAF area 121 are all selected, and as a result, no unselected physical chunk is present (No in step S27), the second rearrangement unit 402 proceeds to step S30. In step S30, the second rearrangement unit 402 selects a set of physical chunks which is most highly evaluated (i.e., whose throughput is the largest), based on the chunk history management table 424 and the evaluation result management table 425, as follows. First, the second rearrangement unit 402 refers to the evaluation result management table 425, and thus specifies an evaluation result number indicative of an evaluation result showing the largest throughput. Then, the second rearrangement unit 402 refers to the chunk history management table 424, and thus specifies an entry including a chunk history number conforming to the specified evaluation result number. Further, the second rearrangement unit 402 selects a set of physical chunks (Q physical chunks) indicated in a physical chunk list set in the specified entry in the chunk history management table 424, as a set of physical chunks most highly evaluated.

Next, the second rearrangement unit 402 relocates (copies) data of the selected Q physical chunks to the T area 111 (step S31). More specifically, the second rearrangement unit 402 restores a relocation state to a relocation state mostly highly evaluated, by relocating to the T area 111, data of Q logical chunks to which the selected Q physical chunks are allocated. Although it is omitted in the flowchart of FIG. 11, the second rearrangement unit 402 executes processings respectively corresponding to steps S28 and S25 before and after the above relocation (step S31). The second rearrangement unit 402 may provide the user with a list of evaluation results indicated by the evaluation result management table 425 through the user interface, and cause the user to select a desired one of the list of evaluation results. In this case, it suffices that the second rearrangement unit 402 selects a set of physical chunks whose evaluation results are selected by the user.

After executing step S31, the second rearrangement unit 402 determines whether initialization of a status regarding the second relocation processing (more specifically, the chunk history management table 424 and the evaluation result management table 425) is designated by the user (step S32). If the initialization of the status is designated (Yes in step S32), the second rearrangement unit 402 initializes the status (step S33), and ends the second relocation processing. On the other hand, if the initialization of the status is not designated (No in step S32), the second rearrangement unit 402 skips over step S33, and ends the second relocation processing. In this case, if a subsequent second relocation processing is started, the present chunk history management table 424 and evaluation result management table 425 are also used.

In the embodiment, the second rearrangement unit 402 periodically (e.g., the intervals of one hour) performs the above relocation (e.g., steps S22, S28, S29 and S24-27) in the second relocation processing. However, the intervals at which this relocation is performed may be changed based on whether the evaluation result in the evaluation processing is better than a previous one or not. More specifically, if the evaluation result is better than the previous one, in order that this state be maintained as long as possible, the second rearrangement unit 402 may delay time at which a subsequent relocation is started. By contrast, if the evaluation result is worse than the previous one, the second rearrangement unit 402 may advance the time at which the subsequent relocation is started. Furthermore, the second relocation processing, for example, may be executed as appropriate or periodically in accordance with a user's instruction.

Figure 13:
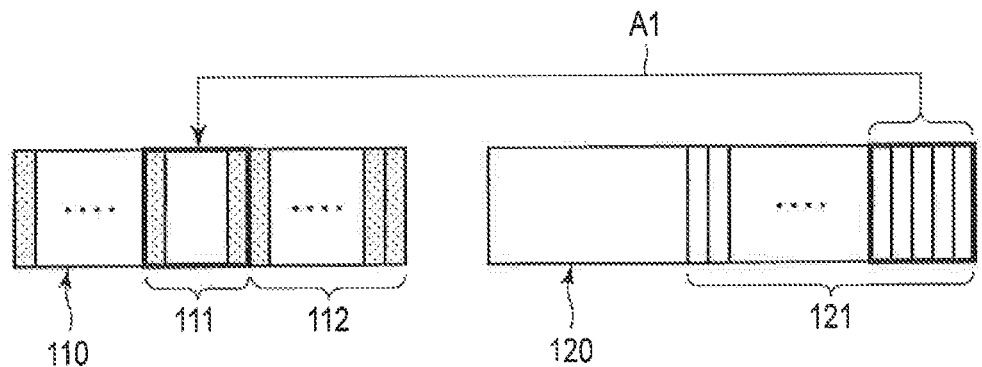
FIG. 13 is a view for explaining an outline of initial relocation in the second relocation processing.
Figure 14:
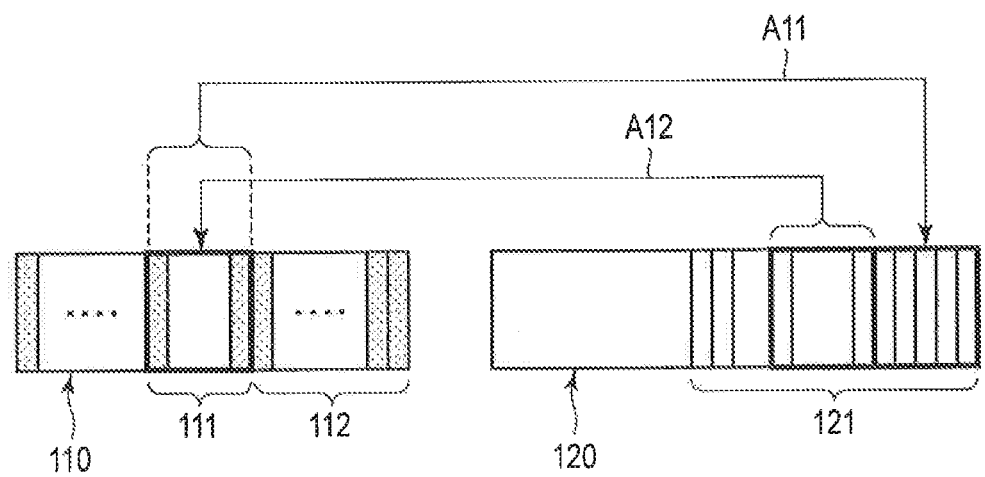
FIG. 14 is a view for explaining an outline of relocation other than the initial relocation in the second relocation processing.

FIGS. 13 and 14 are views for explaining an outline of the second relocation processing in the embodiment. FIG. 13 is a view for explaining an outline of initial relocation in the second relocation processing, and FIG. 14 is a view for explaining an outline of relocation other than the initial relocation in the second relocation processing.

In the initial relocation (Yes in step S22), Q physical chunks from a leading physical chunk in the LAF area 121 of the low-speed physical volume 120 are selected (step S23). Then, data of the selected Q physical chunks is copied (relocated) to the T area 111 of the high-speed physical volume 110 as indicated by arrow A1 in FIG. 13 (step S24). It should be noted that FIGS. 13 and 14 show the case where Q=5 as a matter of convenience in the figure.

In the relocation other than the initial relocation (No in step S22), first, data of the T area 111 is moved (relocated) to the original area of the LAF area 121 as indicated by arrow A11 in FIG. 14 (step S28). Next, in the LAF area 121, Q physical chunks from a leading physical chunk in an area subsequent to the above area subjected to the precedent relocation are selected (step S29). Then, data of the selected Q physical chunks is copied (relocated) to the T area 111 as indicated by arrow A12 in FIG. 14 (step S24).

In such a manner, in the embodiment, the second rearrangement unit 402 relocates data of a set of physical chunks (a set of physical chunks of the low-speed physical volume 120) which would not be allocated in the high-speed physical volume 110 in the relocation based on the access frequency (access frequency statistical values), to the T area 111 of the high-speed physical volume 110 (step S24). In this state, the evaluation unit 404 evaluates an advantage of the above relocation (i.e., relocation of data from the LAF area 121 to the T area 111) (step S26). That is, in the embodiment, data of a set of physical chunks which would not be selected (i.e., whose advantage could not be ascertained) in the relocation based on the access frequency is relocated to the T area 111 in the high-speed physical volume 110, and the advantage of the relocation can be evaluated. Furthermore, in the embodiment, such relocation and evaluation as described above are executed in units of Q successive physical chunks in the LAF area 121, and histories of the relocation and evaluation are recorded in the chunk history management table 424 and the evaluation result management table 425. Therefore, according to the embodiment, Q physical chunks which are mostly highly evaluated are specified based on the chunk history management table 424 and the evaluation result management table 425, and data of the specified Q physical chunks can be relocated to the T area 111 (it can be restored therein). Therefore, the performance of the tiered storage system 10 can be further improved.

The evaluation unit 404 may execute a sequential read access to an arbitrary storage area (fourth storage area) in the logical volume 16 instead of a random read access to the logical volume 16, in order to evaluate an advantage of relocation of data of logical chunks from the LAF area 121 to the T area 111. In this case, it suffices that the evaluation unit 404 acquires a throughput in the sequential read access, as an evaluation result. As the arbitrary storage area, a storage area especially required to improve the throughput of the sequential read access, for example, a storage area storing specific backup data may be specified. Also, as the above arbitrary storage area, the entire logical volume 16 may be applied. Furthermore, the evaluation unit 404 may execute the random read access and the sequential read access, and acquire, e.g., an average value of throughputs in those read accesses as an evaluation result.

Modification

A modification of the embodiment will be explained. In the embodiment, in the second relocation processing, physical chunks are sequentially selected from the LAF area 121 of the low-speed physical volume 120 such that Q physical chunks are selected at a time. Then, each time Q physical chunks are selected, data of the selected Q physical chunks is relocated to the T area 111 of the high-speed physical volume 110. On the other hand, in the modification, Q physical chunks the data of which is to be relocated to the T area 111 are selected in a different manner as in the embodiment.

In the modification, suppose based on the access frequency, data is located (copied) from physical chunks in the LAF area 121 of the low-speed physical volume 120 to physical chunks in the HAF area 112 of the high-speed physical volume 110. The physical chunks in the LAF area 121 in such a case are referred to as high access frequency physical chunks. The modification is featured in that for each of high access frequency physical chunks the data of which is newly relocated from the HAF area 112 to the T area 111, data of Q physical chunks located close to said each high access frequency physical chunk is relocated to the T area 111.

Figure 15:
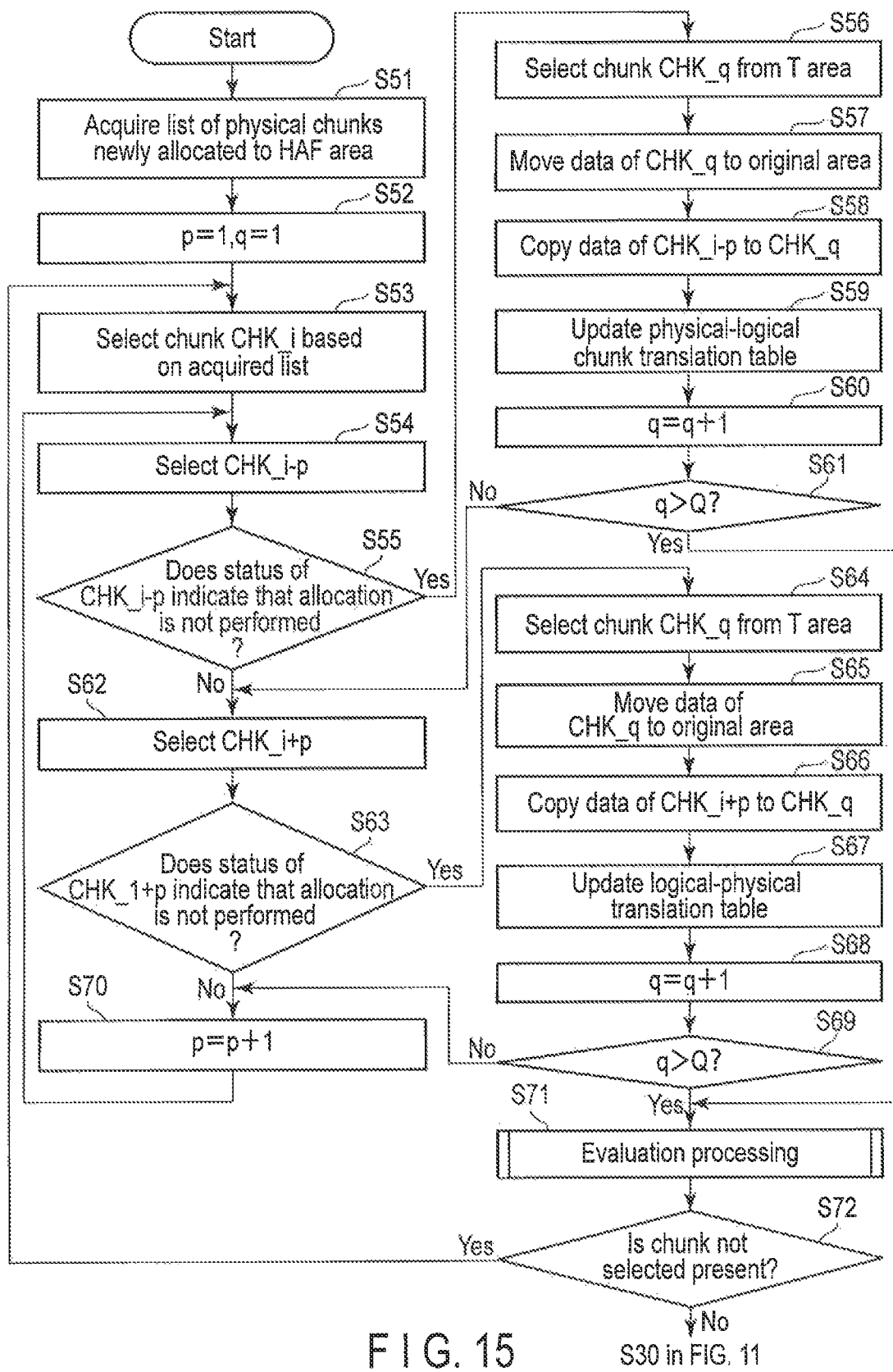
FIG. 15 is a flowchart for explaining an exemplary procedure of a second relocation processing in a modification of the embodiment.

A second relocation processing in the modification (i.e., a modification of the above second relocation processing in the embodiment) will be explained with reference to FIG. 15. FIG. 15 is a flowchart for explaining an exemplary procedure of the second relocation processing executed by the second rearrangement unit 402 in the modification. In the modification, suppose the second relocation processing is executed upon ending of the first relocation processing. Furthermore, in the first relocation processing, the first rearrangement unit 401 generates a physical chunk list the data of which is newly allocated form the LAF area 121 to the HAF area 112.

In the second relocation processing, the second rearrangement unit 402 acquires the physical chunk list generated by the first rearrangement unit 401 (step S51). Then, the second rearrangement unit 402 sets variables p and q to an initial value 1 (step S52). The variable p is indicative of a relative position of a physical chunk with reference to an i-th physical chunk CHK_i in the LAF area 121. For example, physical chunks CHK_i−p and CHK_i+p are an i−p-th physical chunk and an i+p-th physical chunks in the LAF area 121, respectively. That is, the physical chunks CHK_i−p and CHK_i+p are precedent and subsequent to the physical chunk CHK_i, respectively by p chunks. The variable q is indicative of a relative position of a physical chunk in the T area 111. For example, a physical chunk CHK_q is a q-th physical chunk in the T area 111.

Next, the second rearrangement unit 402 selects the physical chunk (sixth physical chunk) CHK_i based on the acquired physical chunk list (step S53). Then, the second rearrangement unit 402 selects the physical chunk CHK_i−p from the LAF area 121 based on the selected physical chunk CHK_i and the variable p (step S54). Then, the second rearrangement unit 402 refers to the status in the entry in the physical chunk management table 422, which is associated with the selected physical chunk CHK_i−p, and determines whether the status (i.e., the status of the physical chunk CHK_i−p) is indicative of that allocation is not performed (step S55).

If the status is indicative of that allocation is not performed (Yes in step S55), the second rearrangement unit 402 selects a q-th physical chunk CHK_q from the T area 111 (step S56). Next, the second rearrangement unit 402 moves data of the selected physical chunk CHK_q to an original area in the low-speed storage device 12 (the low-speed physical volume 120) as in step S28 in the embodiment (step S57).

Next, the second rearrangement unit 402 copies data of the selected physical chunk CHK_i−p to the selected physical chunk CHK_q (step S58). In such a manner, the second rearrangement unit 402 relocates data of the physical chunk (third physical chunk) CHK_i−p to the physical chunk (fourth physical chunk) CHK_q in the T area 111. That is, the second rearrangement unit 402 reallocates the physical chunk CHK_q to a logical chunk (third logical chunk) to which the physical chunk CHK_i−p is allocated.

Next, the second rearrangement unit 402 updates the logical-physical chunk translation table 421 such that the above movement of data (step S57) and copying of data (step S58) are reflected therein (step S59). In step S59, the second rearrangement unit 402 sets the status in the entry in the physical chunk management table 422, which is associated with the physical chunk CHK_i−p to 1. Then, the second rearrangement unit 402 increments the variable q by 1 (step S60). Further, the second rearrangement unit 402 determines whether the incremented variable q exceeds Q (step S61). As described above, Q is indicative of the number of physical chunks in the T area 111.

If the incremented variable q does not exceed Q (No in step 61), the second rearrangement unit 402 proceeds to step S62 in order to select a subsequent physical chunk. Also, if the status of the physical chunk CHK_i−p is indicative of that allocation is performed (No in step S55), the second rearrangement unit 402 proceeds to step S62. In step S62, the second rearrangement unit 402 selects the physical chunk CHK_i+p from the LAF area 121. Next, the second rearrangement unit 402 refers to the status in the entry in the physical chunk management table 422, which is associated with the selected physical chunk CHK_i+p, and determines whether the above status (i.e., the status of the physical chunk CHK_i+p) is indicative of that allocation is not performed (step S63).

If the status is indicative of that allocation is not performed (Yes in step S63), the second rearrangement unit 402 selects a q-th physical chunk CHK_q from the T area ill (step S64). Then, the second rearrangement unit 402 moves data of the selected physical chunk CHK_q to an original area in the low-speed storage device 12 (step S65).

Next, the second rearrangement unit 402 copies data of the selected physical chunk CHK_i+p to the physical chunk CHK_q (step S66). In such a manner, the second rearrangement unit 402 relocates data of the physical chunk CHK_i+p to the physical chunk CHK_q in the T area 111. That is, the second rearrangement unit 402 reallocates physical chunk CHK_q to the logical chunk to which the physical chunk CHK_i+p is allocated.

Then, the second rearrangement unit 402 updates the logical-physical chunk translation table 421 such that the above movement of data (step S65) and copying of data (step S66) are reflected therein (step S67). In step S67, the second rearrangement unit 402 sets the status in the entry in the physical chunk management table 422, which is associated with the physical chunk CHK_i+p to 1. Next, the second rearrangement unit 402 increments the variable q by 1 (step S68). Then, the second rearrangement unit 402 determines whether the incremented variable q exceeds Q (step S69).

If the incremented variable q does not exceed Q (No in step S69), the second rearrangement unit 402 proceeds to step S70 in order select a subsequent physical chunk. Also, if the status of the physical chunk CHK_i+p is indicative of that allocation is performed (No in step S63), the second rearrangement unit 402 proceeds to step S70. In step S70, the second rearrangement unit 402 increments the variable p by 1. Then, the second rearrangement unit 402 returns to step S54, and selects the physical chunk CHK_i−p from the LAF area 121 based on the incremented variable p and the physical chunk CHK_i selected in step S53. In such a manner, the second rearrangement unit 402 repeats steps S54 to S70 until the incremented variable q exceeds Q (Yes in step S61 or step S69).

Then, suppose the incremented variable q exceeds Q (Yes in step S61 or step S69). In this case, the second rearrangement unit 402 determines that data of Q physical chunks located close to (previous and subsequent to) the physical chunk CHK_i included in the LAF area 121 is relocated to the T area 111. Thus, the second rearrangement unit 402 executes an evaluation processing equivalent to that (step S26) of the embodiment in order to evaluate an advantage of the above relocation (step S71).

After executing the evaluation processing (step S71), the second rearrangement unit 402 determines whether the physical chunk list acquired in step S51 contains a physical chunk or chunks not selected (step S72). If it contains a physical chunk or chunks not selected (Yes in step S72), the second rearrangement unit 402 returns to step S53, and selects a physical chunk CHK_i not selected. In such a manner, the second rearrangement unit 402 repeats steps S53 to S72 until the number of physical chunks not selected becomes zero (No in step S72).

Then, suppose the number of physical chunks not selected becomes zero (No in step S72). In this case, the second rearrangement unit 402 executes steps from step S30 onward, which is shown in FIG. 11. It should be noted that if the physical chunk CHK_i is first selected, the second rearrangement unit 402 does not need to move data of the T area 111 to the original area in the low-speed storage device 12, before relocating data of Q physical chunks located close to the physical chunk CHK_i to the T area 111. However, in the flowchart of FIG. 15, a procedure of processing in the case where the physical chunk CHK_i is first selected is omitted in order to simplify the flowchart.

Also, although it is omitted in the flowchart of FIG. 15, in the case where the physical chunk CHK_i−p is not included in the LAF area 121, the second rearrangement unit 402 skips over steps S55 to S61. Similarly, if the physical chunk CHK_i+p is not included in the LAF area 121, the second rearrangement unit 402 skips over steps S63 to S69. Also, if neither the physical chunk CHK_i−p nor the physical chunk CHK_i+p is included in the LAF area 121, the second rearrangement unit 402 returns relocated data in T area 111 to an original area in the LAF area 121, and executes steps from step S30 onward, which is shown in FIG. 11.

FIG. 16 is a view for explaining an outline of the second relocation processing in the modification. Referring to FIG. 16, suppose the physical chunk CHK_i in the LAF area 121 is selected (step S53). Data of the physical chunk CHK_i is interchanged with data of physical chunk CHK_J in the HAF area 112 by the first relocation processing precedent to the present second relocation processing, as indicated by allow A21 in FIG. 16 (step S6).

Data of Q physical chunks in the T area 111 is moved (relocated) to the original area in the LAF area 121 as indicated by arrow A22 in FIG. 16 (steps S57 and S65). On the other hand, data of Q physical chunks located close to the selected physical chunk CHK_i is copied (relocated) to Q physical chunks in the T area 111 as shown in arrows A23 and A24 in FIG. 16 (steps S58 and S66).

In such a manner, in the modification, with respect to each of high access frequency physical chunks the data of which is newly relocated from the LAF area 121 to the HAF area 112 by the first rearrangement unit 401, the second rearrangement unit 402 selects Q physical chunks located close to said each high access frequency physical chunk. Then, the second rearrangement unit 402 relocates data of the selected Q physical chunks to the T area 111. That is, with respect to each of the high access frequency physical chunks, the second rearrangement unit 402 relocates data of Q physical chunks close to said each high access frequency physical chunk to the T area 111. In this state, the evaluation unit 404 evaluates an advantage of the above relocation (step S71). Therefore, in the modification, it is possible to select a set of physical chunks which can be expected to obtain a greater advantage than in the embodiment in which physical chunks are sequentially selected from the LAF area 121 such that Q physical chunks are selected at a time.

According to at least one embodiment described above, it is possible to give an opportunity to allocate a high-speed area to a chunk whose access frequency is low, and evaluate an advantage obtained by such allocation with respect to the system performance.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A tiered storage system comprising:
   a first storage device comprising a storage area including a plurality of physical chunks each having a first size;
   a second storage device comprising a storage area including a plurality of physical chunks each having the first size, the second storage device having a lower access speed and a larger storage capacity than the first storage device; and
   a storage controller configured to control the first storage device and the second storage device, and comprising a logical volume management unit, an access statistical collection unit, a first rearrangement unit, a second rearrangement unit and an evaluation unit,
   wherein:
   the logical volume management unit is configured to manage a logical volume to which a first storage area of the first storage device, a second storage area of the first storage device and a third storage area of the second storage device are allocated in units of physical chunks, the logical volume including a plurality of logical chunks each having the first size, and being provided to a host computer;
   the access statistical collection unit is configured to collect access frequency statistical values indicative of states of accesses to the plurality of logical chunks in the logical volume, respectively;
   the first rearrangement unit is configured to:
   select a first logical chunk whose access frequency statistical value is great; and
   reallocate a second physical chunk in the first storage area to the first logical chunk and reallocate a first physical chunk in the third storage area to a second logical chunk, if the first physical chunk is allocated to the first logical chunk before the reallocation of the first physical chunk and the second physical chunk is allocated to the second logical chunk before the reallocation of the second physical chunk, and if the second logical chunk has an access frequency statistical value smaller than that of the first logical chunk;

the second rearrangement unit is configured to:
sequentially select a plurality of sets of physical chunks in the third storage area, regardless of access frequency statistical values of logical chunks included in a plurality of sets of logical chunks to which the plurality of sets of physical chunks are allocated;

in accordance with selection of one of the sets of physical chunks, reallocate a third set of physical chunks in the second storage area to a set of logical chunks to which the selected one of the sets of physical chunks has been allocated; and reallocate a second set of physical chunks in the third storage area to a second set of logical chunks, when a first set of physical chunks in the third storage area is selected as the one of the sets of physical chunks, and if the third set of physical chunks in the second storage area is reallocated to the second set of logical chunks before the first set of physical chunks is selected and the second set of physical chunks is allocated to the second set of logical chunks before the third set of physical chunks is reallocated to the second set of logical chunks; and the evaluation unit is configured to:
execute at least one of a random read access to the logical volume and a sequential read access to a fourth storage area of the logical volume in accordance with reallocating the third set of physical chunks to the set of logical chunks to which the selected one of the sets of physical chunks has been allocated;

measure a throughput of the at least one of the random read access and the sequential read access; and acquire the measured throughput as an evaluation result obtained by reallocating the third set of physical chunks to the set of logical chunks to which the selected one of the sets of physical chunks has been allocated; and the second rearrangement unit is further configured to reallocate the third set of physical chunks in the second storage area to a first set of logical chunks when a throughput acquired by a first reallocation is the greatest, the first reallocation including reallocating the third set of physical chunks to the first set of logical chunks when the first set of physical chunks is selected as the one of the sets of physical chunks, the first set of logical chunks being a set of logical chunks to which the first set of physical chunks is allocated before the first reallocation.

2. The tiered storage system of claim 1, wherein:
the storage controller further comprises a third storage device; and
the evaluation unit is further configured to store in the third storage device a first history and a second history, the first history including evaluation results obtained by reallocating the third set of physical chunks in the second storage, the second history including a physical chunk list indicative of a set of physical chunks in the third storage area, which is allocated to a set of logical chunks before the third set of physical chunks is reallocated to the set of logical chunks in accordance with the selection of the one of the sets of physical chunks.

3. The tiered storage system of claim 2, wherein the second rearrangement unit is further configured to:
specify, based on the first history, the first reallocation by which the greatest throughput is acquired;
specify, based on the second history, the first set of physical chunks in the third storage area, which is allocated to the first set of logical chunks before the third set of physical chunks is reallocated to the first set of logical chunks by the first reallocation; and
copy data of the specified set of physical chunks to the third set of physical chunks the second storage area.

4. The tiered storage system of claim 1, wherein
the selected one of the sets of physical chunks is a set of physical chunks located close to one of physical chunks in the third storage area, the one of the physical chunks being a physical chunk allocated to a certain logical chunk before a physical chunk in the first storage area is reallocated to the certain logical chunk.

5. A storage controller of a tiered storage system comprising a first storage device and a second storage device having a lower access speed and a larger storage capacity than the first storage device, the storage controller being configured to control the first storage device and the second storage device, the first storage device comprising a storage area including a plurality of physical chunks each having a first size, the second storage device comprising a storage area including a plurality of physical chunks each having the first size, the storage controller comprising:

a logical volume management unit configured to manage a logical volume to which a first storage area of the first storage device, a second storage area of the first storage device and a third storage area of the second storage device are allocated in units of physical chunks, the logical volume including a plurality of logical chunks each having the first size, and being provided to a host computer;

an access statistical collection unit configured to collect access frequency statistical values indicative of states of accesses to the plurality of logical chunks in the logical volume, respectively;

a first rearrangement unit configured to:
select a first logical chunk whose access frequency statistical value is great; and
reallocate a second physical chunk in the first storage area to the first logical chunk and reallocate a first physical chunk in the third storage area to a second logical chunk, if the first physical chunk is allocated to the first logical chunk before the reallocation of the first physical chunk and the second physical chunk is allocated to the second logical chunk before the reallocation of the second physical chunk, and if the second logical chunk has an access frequency statistical value smaller than that of the first logical chunk; and a second rearrangement unit configured to:
sequentially select a sot of third logical plurality of sets of physical chunks in the third storage area, regardless of access frequency statistical values of logical chunks included in a plurality of sets of logical chunks to which the plurality of sets of physical chunks are allocated;

in accordance with selection of one of the sets of physical chunks, reallocate a third set of physical chunks in the second storage area to a set of logical chunks to which the selected one of the sets of physical chunks has been allocated; and reallocate a second set of physical chunks in the third storage area to a second set of logical chunks, when a first set of physical chunks in the third storage area is selected as the one of the sets of physical chunks, and if the third set of physical chunks in the second storage area is reallocated to the second set of logical chunks before the first set of physical chunks is selected and the second set of physical chunks is allocated to the second set of logical chunks before the third set of physical chunks is reallocated to the second set of logical chunks; and an evaluation unit configured to:
execute at least one of a random read access to the logical volume and a sequential read access to a fourth storage area of the logical volume in accordance with reallocating the third set of physical chunks to the set of logical chunks to which the selected one of the sets of physical chunks has been allocated;
measure a throughput of the at least one of the random read access and the sequential read access; and
acquire the measured throughput as an evaluation result obtained by reallocating the third set of physical chunks to the set of logical chunks to which the selected one of the sets of physical chunks has been allocated,
wherein the second rearrangement unit is further configured to reallocate the third set of physical chunks in the second storage area to a first set of logical chunks when a throughput acquired by a first reallocation is the greatest, the first reallocation including reallocating the third set of physical chunks to the first set of logical chunks when the first set of physical chunks is selected as the one of the sets of physical chunks, the first set of logical chunks being a set of logical chunks to which the first set of physical chunks is allocated before the first reallocation.

6. The storage controller of claim 5, further comprising a third storage device,
wherein the evaluation unit is further configured to store in the third storage device, a first history and a second history, the first history including evaluation results obtained by reallocating the third set of physical chunks in the second storage area, the second history including a physical chunk list indicative of a set of physical chunks in the third storage area, which is allocated to a set of logical chunks before the third set of physical chunks is reallocated to the set of logical chunks in accordance with the selection of the one of the sets of physical chunks.

7. The storage controller of claim 5, wherein
the selected one of the sets of physical chunks is a set of physical chunks located close to one of physical chunks in the third storage area, the one of the physical chunks being a physical chunk allocated to a certain logical chunk before a physical chunk in the first storage area is reallocated to the certain logical chunk.

8. An area allocation method implemented in a storage controller of a tiered storage system comprising a first storage device and a second storage device having a lower access speed and a larger storage capacity than the first storage device, the storage controller being configured to control the first storage device and the second storage device, the first storage device comprising a storage area including a plurality of physical chunks each having a first size, the second storage device comprising a storage area including a plurality of physical chunks each having the first size, the area allocation method comprising:

managing a logical volume to which a first storage area of the first storage device, a second storage area of the first storage device and a third storage area of the second storage device are allocated in units of physical chunks, the logical volume including a plurality of logical chunks each having the first size, and being provided to a host computer;
collecting access frequency statistical values indicative of states of accesses to the plurality of logical chunks in the logical volume, respectively;
selecting a first logical chunk whose access frequency statistical value is great;
reallocating a second physical chunk in the first storage area to the first logical chunk and reallocating a first physical chunk in the third storage area to a second logical chunk, if the first physical chunk is allocated to the first logical chunk before the reallocation of the first physical chunk and the second physical chunk is allocated to the second logical chunk before the reallocation of the second physical chunk, and if the second logical chunk has an access frequency statistical value smaller than that of the first logical chunk;
sequentially selecting a plurality of sets of physical chunks in the third storage area, regardless of access frequency statistical values of logical chunks included in a plurality of sets of logical chunks to which the plurality of sets of physical chunks are allocated;
in accordance with selection of one of the sets of physical chunks, reallocating a third set of physical chunks in the second storage area to a set of logical chunks to which the selected one of the sets of physical chunks has been allocated;
reallocating a second set of physical chunks in the third storage area to a second set of logical chunks, when a first set of physical chunks in the third storage area is selected as the one of the sets of physical chunks, and if the third set of physical chunks in the second storage area is reallocated to the second set of logical chunks before the first set of physical chunks is selected and the second set of physical chunks is allocated to the second set of logical chunks before the third set of physical chunks is reallocated to the second set of logical chunks;
executing at least one of a random read access to the logical volume and a sequential read access to a fourth storage area of the logical volume in accordance with reallocating the third set of physical chunks to the set of logical chunks to which the selected one of the sets of physical chunks has been allocated;
measuring a throughput of the at least one of the random read access and the sequential read access;
acquiring the measured throughput as an evaluation result obtained by reallocating the third set of physical chunks to the set of logical chunks to which the selected one of the sets of physical chunks has been allocated; and
reallocating the third set of physical chunks in the second storage area to a first set of logical chunks when a throughput acquired by a first reallocation is the greatest, the first reallocation including reallocating the third set of physical chunks to the first set of logical chunks when the first set of physical chunks is selected as the one of the sets of physical chunks, the first set of logical chunks being a set of logical chunks to which the first set of physical chunks is allocated before the first reallocation.

9. The area allocation method of claim 8, wherein:
the storage controller comprises a third storage device; and
the area allocation method further comprises storing in the third storage device, a first history and a second history, the first history including evaluation results obtained by reallocating the third set of physical chunks in the second storage area, the second history including a physical chunk list indicative of a set of physical chunks in the third storage area, which is allocated to a set of logical chunks, before the third set of physical chunks is reallocated to the set of logical chunks in accordance with the selection of the one of the sets of physical chunks.

10. The area allocation method of claim 8, wherein the selected one of the sets of physical chunks is a set of physical chunks located close to one of physical chunks in the third storage area, the one of the physical chunks being a physical chunk allocated to a certain logical chunk before a physical chunk in the first storage area is reallocated to the certain logical chunk.

11. The storage controller of claim 6, wherein the second rearrangement unit is further configured to:
specify, based on the first history, the first reallocation by which the greatest throughput is acquired;
specify, based on the second history, the first set of physical chunks in the third storage area, which is allocated to the first set of logical chunks before the third set of physical chunks is reallocated to the first set of logical chunks by the first reallocation; and
copy data of the specified first set of physical chunks to the third set of physical chunks in the second storage area.

12. The area allocation method of claim 9, further comprising:
specifying, based on the first history, the first reallocation by which the greatest throughput is acquired;
specifying, based on the second history, the first set of physical chunks in the third storage area, which is allocated to the first set of logical chunks before the third set of physical chunks is reallocated to the first set of logical chunks by the first reallocation; and
copying data of the specified first set of physical chunks to the third set of physical chunks in the second storage area.

* * * * *